(12) United States Patent
Zinner

(10) Patent No.: US 12,113,613 B2
(45) Date of Patent: Oct. 8, 2024

(54) METHOD FOR VERIFYING THE VALIDITY OF SENSOR DATA OF AN ETHERNET ONBOARD NETWORK

(71) Applicant: Continental Automotive GmbH, Hannover (DE)

(72) Inventor: Helge Zinner, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 117 days.

(21) Appl. No.: 17/784,320

(22) PCT Filed: Dec. 16, 2020

(86) PCT No.: PCT/EP2020/086533
§ 371 (c)(1),
(2) Date: Jun. 10, 2022

(87) PCT Pub. No.: WO2021/122823
PCT Pub. Date: Jun. 24, 2021

(65) Prior Publication Data
US 2023/0053772 A1 Feb. 23, 2023

(30) Foreign Application Priority Data
Dec. 20, 2019 (DE) .................. 10 2019 220 495.3

(51) Int. Cl.
*H04J 3/06* (2006.01)
*H04J 3/14* (2006.01)
(52) U.S. Cl.
CPC ............. *H04J 3/0661* (2013.01); *H04J 3/14* (2013.01)
(58) Field of Classification Search
CPC .................... H04J 3/0661; H04J 3/14
See application file for complete search history.

(56) References Cited

U.S. PATENT DOCUMENTS 10,594,241 B1 * 3/2020 Proietty .................. H02P 23/22
11,741,243 B1 * 8/2023 Matsumoto ........... G06F 21/602
380/28
(Continued)

FOREIGN PATENT DOCUMENTS

DE 102013224697 A1 6/2015
DE 102018207684 A1 11/2019
(Continued)

OTHER PUBLICATIONS

Notice of Reasons for Refusal dated Sep. 5, 2023 from corresponding Japanese patent application No. 2022-537048.
(Continued)

*Primary Examiner* — Bailor C Hsu

(57) ABSTRACT

The validity of sensor data of an Ethernet onboard network in a motor vehicle is checked by: determining a delay time of a first signal on a first connecting path between a first control unit of the Ethernet onboard network and a second control unit of the Ethernet onboard network; determining a maximum speed of the first connecting path on the basis of the delay time; and determining a type of a transmission medium of the first connecting path on the basis of the maximum speed. The following steps are also carried out: identifying at least a first control unit of the Ethernet onboard network, synchronizing at least a first control unit of the Ethernet onboard network, ascertaining the synchronization interval, ascertaining a drift of a timer of the first control unit, ascertaining a timestamp of the first control unit, reading a timestamp of the first control unit.

45 Claims, 22 Drawing Sheets

(56) References Cited

U.S. PATENT DOCUMENTS

| | | |
|---|---|---|
| 2008/0183896 A1 | 7/2008 | Carlson et al. |
| 2015/0153178 A1* | 6/2015 | Koo .................. G01S 19/49 701/472 |
| 2016/0039436 A1* | 2/2016 | Bhagwatkar ........... B61L 27/53 348/148 |
| 2017/0026144 A1 | 1/2017 | Zinner |
| 2018/0088584 A1* | 3/2018 | Tascione ............ G05D 1/0276 |
| 2019/0130743 A1* | 5/2019 | Dabby ................. G01C 21/28 |
| 2019/0251764 A1* | 8/2019 | Wang ................ G06F 16/2282 |
| 2020/0074853 A1* | 3/2020 | Miller ................. G08G 1/012 |
| 2020/0210779 A1* | 7/2020 | Atsmon .................. G06T 7/55 |
| 2020/0295861 A1 | 9/2020 | Zinner |
| 2021/0000006 A1* | 1/2021 | Ellaboudy ........... A01B 69/008 |
| 2021/0024096 A1* | 1/2021 | Wang ................ G06V 20/582 |
| 2021/0043081 A1* | 2/2021 | Garrett .................. G08B 3/10 |
| 2021/0120386 A1 | 4/2021 | Zinner et al. |
| 2021/0218656 A1 | 7/2021 | Meier et al. |

FOREIGN PATENT DOCUMENTS

| | | |
|---|---|---|
| EP | 2191300 A1 | 6/2010 |
| EP | 2382829 A1 | 11/2011 |
| EP | 2490357 A2 | 8/2012 |
| EP | 2759174 A1 | 7/2014 |
| JP | 2012170076 A | 9/2012 |
| JP | 2017034671 A | 2/2017 |
| WO | 2019081463 A1 | 5/2019 |
| WO | 2019197233 A1 | 10/2019 |

OTHER PUBLICATIONS

"Automotive Ethernet AVB Functional and Interoperability Specification", http://avnu.org/wp-content/uploads/2014/05/AutoCDSFunctionalSpec-1_4-public_with_legal_notices-2.pdf, Revision 1.4, May 12, 2015.

Zinner et al. "A Comparison of Time Synchronization in AVB and FlexRay in-vehicle networks", Nov. 7, 2011.

"Audio Video Bridging Task Group", http://www.all-electronics.de/zeitsynchronisation-in-automotive-ethernet-netzen/, IEEE, 2013.

"P802.1AS-Rev—Timing and Synchronization for Time-Sensitive Applications", IEEE802.1AS-Rev/Zeitsynchronisation: https://1.ieee802.org/tsn/802-1as-rev/, IEEE802, 2018.

International Search Report and Written Opinion dated Apr. 15, 2021 from corresponding International patent application No. PCT/EP2020/086533.

* cited by examiner

METHOD FOR VERIFYING THE VALIDITY OF SENSOR DATA OF AN ETHERNET ONBOARD NETWORK

BACKGROUND

The present invention relates to a method for checking the validity of sensor data.

Automobile manufacturers (OEMs) and tier-1 suppliers in the automotive industry are preparing the next generation of architecture for vehicle controllers or electronic control devices/control units, ECUs. One development is the so-called "zone-oriented architecture", in which control devices are grouped into zones, such as e.g. a front right door zone. A difference from previous architectures is that the controllers are located at specific physical or spatial positions in order to optimally capture the data from the sensors positioned there. As such, for example a control unit that collects data from a sensor in the front right door may be positioned in the front right door zone.

The localization or distribution of software execution for features and applications to other controllers and processors is also under consideration. Such localization or distribution may be part of an optimization and may also be used in the event of an error or failure, e.g. of a control device. This localization or distribution is known as dynamic migration or simply migration. Mass production for the dynamic migration of software to other control devices/processors within the vehicle is expected soon.

Ethernet may be the network of choice for connecting control devices in a network. Ethernet technology is becoming increasingly popular for the electrical systems of vehicles and supplier products. The use of Ethernet technology requires an effective synchronization concept.

Existing Ethernet systems may use an implementation of the time synchronization standard IEEE 802.1AS. Two variants that have attracted particular attention are the selection of the 802.1AS-Rev and the time domain of the 802.1AS-Rev, the latter being a mandatory requirement for the former. Other protocols outside of the physical transmission standards are Ethernet AVB and its successor Ethernet TSN. Ethernet AVB has already been introduced for automobiles in mass production. An essential substandard for Ethernet TSN and AVB is the time synchronization standard IEEE802.1AS, which depends on the main standard IEEE 802.1 for higher layer LAN protocols (bridging). Both standards use the IEEE 1588 Precision Time Protocol (PTP) to establish a common time base in an Ethernet network.

On layer 3 of the OSI layer model, Ethernet connections support a large number of switching protocols for the transmission of data packets between transmitters and receivers. In the higher protocol layers, the segmentation of the data stream into packets, the process communication between communicating systems, the translation of data into a system-independent form and finally the provision of functions for applications take place.

Almost all Ethernet communication networks used in vehicles use a protocol relating to time synchronization that provides a global network time base that is synchronous in all network devices. The prevalence of time-synchronized network devices is expected to continue to increase in the future.

The IEEE 802.1AS standard provides such a protocol relating to time synchronization. Based on a so-called "best clock" in the network, also known as a grandmaster or grandmaster clock, a master-slave clock hierarchy is set up. The grandmaster provides the time base for the network, to which all other network devices in the network are synchronized. The grandmaster is determined by means of the so-called Best Master Clock Algorithm (BMCA) and is announced within the network. To do this, IEEE 802.1AS compatible network devices send Announce messages containing information about their internal clock to other network devices that are directly connected. The information about the internal clocks provides an indication of the accuracy of the respective clock, the reference or time reference thereof and other properties that can be used to determine the best clock in the network. A recipient of such an Announce message compares the information received with the features of its own internal clock and any messages already received from another port with information relating to clocks of other network devices, and accepts a clock in another network device if it has better clock parameters. After a short time, the best clock in the network has been ascertained, which then becomes the grandmaster in the network. Based on the grandmaster, messages relating to time synchronization are broadcast over the network. A network device that receives a message relating to time synchronization does not simply forward it, but rather corrects the time information for the previously ascertained delay time on the connection by way of which it receives messages relating to time synchronization from a directly connected network device, and also for the internal processing time, before it retransmits the message relating to time synchronization with the corrected time information.

In the case of the clock hierarchy according to IEEE 802.1AS and the generalized precision time protocol (gPTP) defined therein, only a single network device always provides the best clock in the network. This network device therefore controls and regulates the whole time of the vehicle. All other clocks in network devices in the network are governed exclusively by this one clock. Some vehicle manufacturers even synchronize networks of other standards, for example CAN, by way of this Ethernet time master, which means that almost all network devices in the vehicle are informed of the system time by the network device that provides the grandmaster. As a result, a single network device is defined as a single point of failure in the network or the vehicle, the failure or manipulation of which device can have serious effects on the operational safety of the vehicle. As such, for example in vehicles with a high degree of driver support by appropriate systems or with systems for (semi)autonomous driving, a large volume of sensor data captured within a narrow time window must be processed together in order to derive appropriate control signals for actuators in the vehicle. The most accurate possible time registration for sensor data may also be of great importance for documentation purposes, for example when storing in log files that can be analyzed in order to reconstruct malfunctions or operating errors. The latter is of great interest in particular to insurance companies and law enforcement agencies. Safe, synchronized provision of the time information is thus essential.

According to EP 2 759 174 A1, the difference between the counter of the received node and the receiving node is determined on the basis of a timestamp and an error calculation unit. The error value is calculated from the difference between the two counter values (absolute) or using the difference between the drift of the two counter values.

EP 2 490 357 A2 describes a method for synchronizing a local estimate of the global network time of a receiving node in a network with a global network time reference from one of at least first and second transmitting nodes in the network.

The clock synchronization method allows a free-running node in an avionics network to be determined in order to detect whether or not a node has been synchronized. In the event of detection, it is proposed that a sync flag be set.

U.S. Pat. No. 2,008,183 896 A1 explains that when the loss of communication is found to last for too long, which is defined for the network beforehand and is a function of the maximum drift rate of the clock for a server with respect to the clock for the clock source of this server, the receiving server declares its time parameters to be invalid.

EP 2 191 300 A1 discloses a sensor network for acquiring earthquake data. To this end, clock update cycles are determined on the basis of the maximum tolerated time deviation and the ascertained (current) frequency drift.

EP 2 382 829 A1 discloses a method for synchronizing a reference frequency of a base station transceiver (BTS) with the reference frequency of a base station controller (BSC) comprising a series of steps, wherein synchronization packets are transmitted and are provided with a timestamp for transmission and a timestamp for reception. An assessment of network delivery is evaluated after the conclusion of an observation period. If it is high enough, a confidence level for the received synchronization packets is ascertained. Only if the confidence level is above a threshold is a correction made to the reference frequency of the oscillator in the base station transceiver.

The number of environmental sensor systems in automobiles has been increasing continuously for years. In 2016, in addition to the existing ultrasonic and radar sensors, a laser scanner was also used in mass production. Despite different sensor systems being used in automobiles in a way that is almost ready for mass production, there are still unanswered questions regarding the fusion of the sensor data obtained. Data fusions can be used to compensate for weaknesses in individual sensor systems and to guarantee greater fail-safety (robustness) by means of redundancy. In order for the data quality for ADAS systems to remain stable even in traffic jams or in urban surroundings, different sensor systems that monitor the same field of view are required for safety-critical maneuvers, such as e.g. emergency braking. The term sensor fusion describes the merging of data from different sensors. The aim of sensor fusion is for the data of the fusion result to have a higher quality in any aspect than the individual data obtained from the respective sensor. Furthermore, a distinction is drawn between homogeneous and heterogeneous sensor networks. In a homogeneous sensor network, all sensors use the same physical measuring principle and are therefore subject to the same physical limitations (e.g. range, accuracy and sensitivity to noise). In heterogeneous sensor networks, on the other hand, different measurement techniques are used, which means that weaknesses in one sensor can sometimes be compensated for by another. Here, sensor fusion is separated into complementary, competitive and cooperative.

A few approaches for detecting changes in the configuration or structure of a communication network using the time synchronization of a network are known from the prior art. In order to use the additional benefit of sensor fusion, it is necessary to monitor the data streams and the association of said data streams with one another. An unauthorized change in the configuration of the network can lead to disruptions, these possibly involving the preparation of an attack that intercepts messages for analysis and, if necessary, retransmits modified messages. This can be used to prevent or at least disrupt safe and proper operation.

As yet there are no solutions today that validate timestamps. How then should a fusion unit behave if it is supposed to fuse two packets but the timestamps do not match? This does not necessarily mean that the data are old and unusable, of course, but rather that there is an error in the timestamp. It should also be mentioned that all packets are actually important and that it is normally not possible to dispense with any of them. For example, in an ADAS system, there is no time to re-request lost packets. Problems critical to driving safety that are caused by a loss of data have serious consequences and can lead to incorrect control of actuators in the system.

It is therefore an object of the invention to provide a method that, when timestamps have been assigned incorrectly, detects this and, as a result of this detection, checks assigned data for whether the data belong together, since they have a different origin in time, in order to use them reliably by way of the sensor fusion.

BRIEF SUMMARY

This object is achieved by the method and the control unit specified in the independent claims. Embodiments and further developments are specified in respective dependent claims.

In other words, the object of the invention is to safely monitor and secure the time synchronization in the onboard network.

The time may have been distorted by errors, temperature or attacks. Especially with regard to automated driving, time-controlled performance of actions is becoming increasingly important, e.g. synchronization of sensors (camera, lidar, radar, etc.) and the data streams thereof. For these functions in particular, a plausibility check is necessary in order to check whether an operation can be undertaken by the vehicle, for example, or whether the driver should preferably continue to take the wheel. The advantage of the invention can be found in the specification of mechanisms and methods to validate and check the validity of the timestamp for sensor messages.

This method can be used to identify whether the timestamps were distorted deliberately and an attack is possible. In addition, the method detects whether the timestamp may be invalid even though synchronization has not yet taken place. A timestamp may also be erroneous for example due to a so-called bit rotation, which is detected by way of the approach described. If the last successful synchronization is unknown, this can be determined by way of the specified method. The method increases security in the field of Ethernet.

The advantage of the invention is that the synchronization accuracy and thus also the fusion accuracy of sensor data in the network are improved and guaranteed, since standards such as Ethernet or AUTOSAR do not yet provide any automotive tools today. This means that abnormal behavior or a possible error/attack can be detected herewith by way of the consideration presented. By implementing such mechanisms and protocols, it is possible to dispense with any additional hardware and proprietary protocols. This also means that the number of communication technologies in the vehicle does not have to increase any further, or that no additional lines need to be run/connected up.

A further advantage can be found in that the method reduces the load on a data bus in a vehicle. Less synchronization is required, which also has a positive effect on the μC resources, any errors and on power consumption. The essential advantages of the invention also result from the fact that Ethernet can perform time-controlled actions without further additional hardware components such as, for example, temperature-controlled crystals or safety modules. The Ethernet onboard network according to the invention is improved in terms of costs and reliability.

This method may be implemented in particular in the form of software that can be distributed as an update or upgrade for existing software or firmware of subscribers in the network and in this respect is an independent solution.

The detection makes it possible to find out whether, by way of example, a neighboring control device is exposed to particular risk, such as excessively high or excessively low temperature, an error or attack.

The detection of modifications in the network provides another method to ensure data security and functional safety in the onboard network. Should a modified control device be used, for example, then neither the driver nor the workshop is apparently really aware of this—the Ethernet onboard network and the control devices can identify errors on the basis of these described methods.

The invention and the resulting solution are of particular interest for the automotive sector, since the topic of reliability and safety via Ethernet is of great importance in automobiles and will become increasingly important. In the next few years, the sensors (camera and radar) will also transmit uncompressed data via Ethernet. Such a data rate necessitates further techniques to make the Ethernet system more fail-safe and performant. This method helps to facilitate these applications.

An existing problem today and with any new system is the dependency on the communication interfaces and the support therefor. The invention described here allows much more platform-independent development to be carried out. The realization of the invention allows the implementation to be used for longer and the necessary maintenance to be reduced.

By way of example, more precise synchronization allows actions that are more realtime-critical (sensor fusion) to be performed more safely and more reliably. The quality of the sensor data fusion is increased, which ultimately leads to a better environment model and better trajectories.

On the other hand, especially in the field of ADAS, it is generally not economical to equip all subscribers connected to the network with hardware that is sufficient for thoroughly encrypted communication. The method described requires significantly fewer hardware resources and can be put into action using existing implementations and thus significantly increases the safety level without this necessarily being linked to higher production costs for the network or devices connected thereto.

The use of the newly introduced Ethernet protocol in automobiles necessitates mechanisms that make use of simple techniques and given properties of technologies in order to be able to do without expensive implementations and further additional hardware. Earlier detection of attacks and abnormal behavior by means of early analysis of the communication paths allows gaps and errors to be identified before the vehicle is delivered. The network system according to the invention is improved in terms of cost and reliability. The testability of the system is defined more clearly by the invention and this allows test costs to be saved. In addition, the invention affords transparent safety functionality.

The method can be implemented in a control device, and an onboard network consisting of different control devices can be used that ensures improved protection of the time synchronization.

This object is achieved by the method and the control unit specified in the independent claims. Embodiments and further developments are specified in the respective dependent claims.

In one embodiment of the method for checking the validity of sensor data of an Ethernet onboard network, the following steps are carried out in a motor vehicle:
a) determining a delay time (9) of a first signal (10) on a first connecting path (6) between a first control unit (3) of the Ethernet onboard network (2) and a second control unit (4) of the Ethernet onboard network (2);
b) determining a maximum speed (11) of the first connecting path (6) on the basis of the delay time (9); and
c) determining a type of a transmission medium (12) of the first connecting path (6) on the basis of the maximum speed (11).

In addition, at least a first control unit (3) of the Ethernet onboard network is identified, at least a first control unit of the Ethernet onboard network is synchronized, the synchronization interval is ascertained, a drift of a timer of the first control unit is ascertained, a timestamp of the first control unit is ascertained, a timestamp is read or the time of the first control unit is queried, the timestamp is compared with a reference clock of the Ethernet onboard network, a delay time measurement is carried out, the speed of the associated clock generator is ascertained, the time difference of the synchronization interval is ascertained and the last synchronization is ascertained.

In addition, the determination of the delay time of a first signal and the determination of the maximum speed of the first connecting path and the determination of the type of a transmission medium of the first connecting path may result in an entropy source being formed that is used to ascertain at least one dynamic key for the connecting path that is used to encrypt a time synchronization message for the connecting path 6.

In a further embodiment of the method, the drift of the timer is ascertained by means of the protocol IEEE 802.1AS.

A further embodiment of the invention is distinguished in that the comparison of the timestamp with a reference clock of the Ethernet onboard network (3) results in a difference being calculated in the form Tdeviation=Treference−Tsuspect.

A further embodiment of the invention is distinguished in that the speed of the clock generator is determined by means of the PTP NRR (Neighbor Rate Ratio) method.

A further embodiment of the invention is distinguished in that the type of the transmission medium and the ascertainment of the synchronization interval, the ascertainment of a drift of a timer of the first control unit, the ascertainment of a timestamp of the first control unit, the ascertainment of the speed of the associated clock generator, the ascertainment of the time difference of the synchronization interval and the ascertainment of the last synchronization are communicated to a program in the Ethernet onboard network and a connecting path selection of the program is adapted on the basis of the type of the transmission medium.

A further embodiment of the invention is distinguished in that the type of the transmission medium is determined as optical, copper or wireless.

A further embodiment of the invention is distinguished in that a transmission security value (15), which describes a probability of loss of data transmitted by way of the first connecting path (6), is assigned to the first connecting path (6) on the basis of the type of the transmission medium (12).

A further embodiment of the invention is distinguished in that delay times of a plurality of signals on the first connecting path are determined and the fastest delay time of the plurality of signals is selected, the maximum speed of the first connecting path being determined on the basis of the fastest delay time.

A further embodiment of the invention is distinguished in that a delay time of a second signal on a second connecting path, which is different from the first connecting path, between the first control unit and the second control unit is determined, and a maximum speed of the second connecting path is determined, a type of the transmission medium (19) of the second connecting path (7) being determined on the basis of the maximum speed (11) of the second connecting path (7).

A further embodiment of the invention is distinguished in that the method is performed after the first control unit (3) changes from a normal operating mode to an energy-saving mode and/or from the energy-saving mode to the normal operating mode.

Another embodiment of the invention is distinguished in that the delay time of the first signal is determined using the first control unit and a delay time of a third signal on a third connecting path, which is connected to the first control unit only indirectly, between the second control unit (4) and a third control unit of the Ethernet on-board network is determined using the third control unit (5), the determination of the delay time of the third signal being triggered by a service message sent from the first control unit to the third control unit.

The embodiment of the control unit for an Ethernet onboard network, which is in the form of a first control unit, allows a signal to be sent to a second control unit of the Ethernet onboard network and the signal to be received from the second control unit; a delay time of the signal on a connecting path to the second control unit to be determined; a maximum speed of the connecting path to be determined on the basis of the delay time and a type of a transmission medium of the connecting path to be determined on the basis of the maximum speed, the control unit including at least one microprocessor, a volatile memory and nonvolatile memory, at least two communication interfaces, a synchronizable timer, the nonvolatile memory containing program instructions that, when executed by the microprocessor, at least one embodiment of the method as claimed in claims 1 to 10 is implementable and executable.

A further embodiment of the Ethernet onboard network for a motor vehicle is distinguished in that the first control unit and a second control unit are connected to one another by way of at least one connecting path, and the first control unit is in a form as claimed in claim 11.

Another embodiment of the Ethernet onboard network is distinguished in that the Ethernet onboard network comprises a third control unit, which is connected to the first control unit only indirectly and is connected to the second control unit directly by way of a third connecting path, wherein the third control unit is designed to determine a delay time of a third signal on the third connecting path, wherein the first control unit is designed to trigger the determination of the delay time of the third signal by way of a service message to the third control unit.

One embodiment is represented by a computer program product. The computer program product includes instructions that, when the program is executed by a computer, cause said computer to perform the method as claimed in one or more of claims 1-10.

One embodiment is provided on a computer-readable medium on which the computer program product as claimed in claim 12 is stored.

A computer program product according to the invention contains instructions that, when executed by a computer, cause said computer to perform one or more embodiments and further developments of the method described above.

The computer program product may be stored on a computer-readable medium or data carrier. The data carrier may be in a physical embodiment, for example as a hard disk, CD, DVD, flash memory or the like; however, the data carrier, or the medium, may also comprise a modulated electrical, electromagnetic or optical signal that can be received by a computer by means of an appropriate receiver and can be stored in the memory of the computer.

A control unit, at least according to the invention, includes at least one physical communication interface in addition to a microprocessor and nonvolatile and volatile memory and also a timer. The components of the control unit are communicatively connected to one another by means of one or more data lines or data buses. The memory of the control unit contains computer program instructions that, when executed by the microprocessor, configure the network device to implement one or more embodiments of the method described above.

The method according to the invention can be implemented using existing network devices, wherein if necessary only adjustments in the software or in the state machines used for receiving and processing messages relating to time synchronization are required in order to use only the messages relating to time synchronization that come from the grandmaster clock ascertained during the initialization to synchronize the clocks, but still to forward the additional messages relating to time synchronization and not simply delete them. As a result, only low additional costs are incurred for the implementation, if at all. Even existing systems can be configured to implement the method, by way of appropriately changed software. Another advantage of the method according to the invention is that the particular underlying hardware platform is irrelevant as long as it supports synchronization according to the IEEE 802.1AS standard.

BRIEF DESCRIPTION OF THE DRAWINGS

The invention will be explained below by way of example with reference to the drawing.

Identical or similar elements may be referenced using the same reference signs in the figures.

DETAILED DESCRIPTION

Figure 1B:
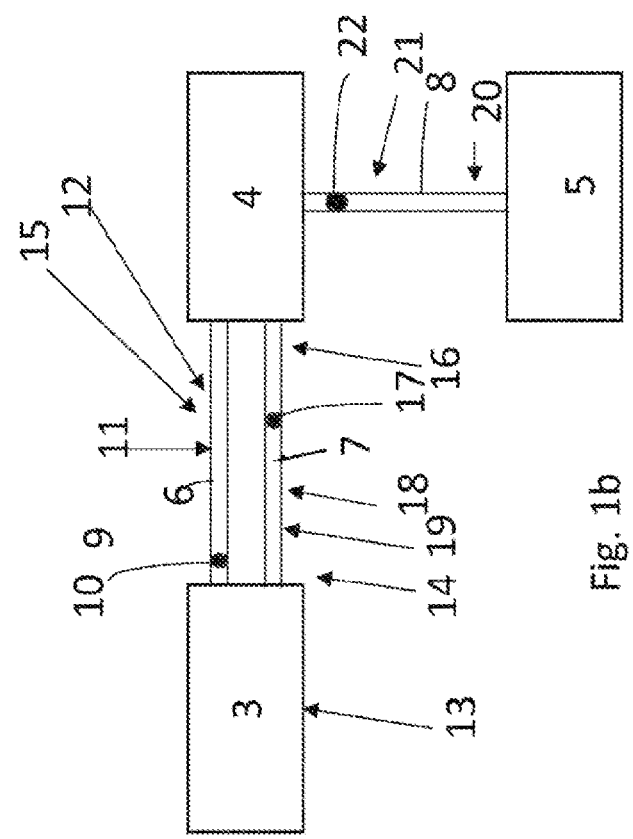
FIG. 1b shows a schematic representation of the Ethernet onboard network having a first control unit, a second control unit and a third control unit, which are connected by way of a first connecting path, a second connecting path and a third connecting path.
Figure 1A:
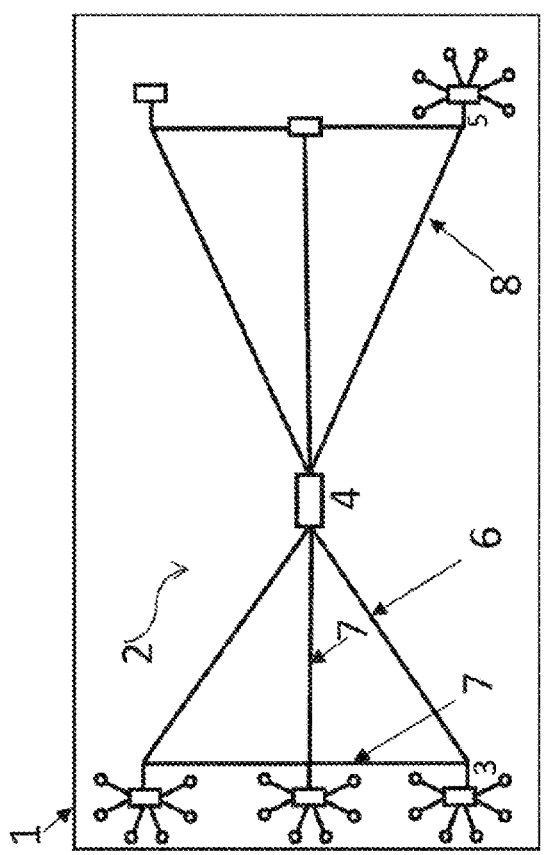
FIG. 1a shows a schematic plan view of a motor vehicle having an exemplary embodiment of an Ethernet onboard network according to the invention.

FIG. 1a shows a motor vehicle 1 in plan view. The motor vehicle 1 comprises an Ethernet onboard network 2. The Ethernet onboard network 2 in turn comprises, according to the exemplary embodiment, a plurality of control units 3, 4, 5, which may also be referred to as control apparatuses or control devices. The control units are connected to one another by way of connecting paths. On account of the existing topology of the Ethernet onboard network 2 in the exemplary embodiment, there are multiple parallel communication paths between the control units. The connecting paths may be formed from different media types or materials, for example.

As the number of Ethernet variants increases, the dynamic change in the connection speed will also be used, for example. This means, for example, that the speed can be changed at run time. For example, a 10 Gbit/s connecting path can be changed to 100 Mbit/s so that energy is saved. Since this is a dynamic function, it may be the case that the onboard network is in a different form after delivery or after initial installation in the motor vehicle than after a software update or in a fault situation, for instance.

The Ethernet onboard network 2 comprises at least one first control unit 3, a second control unit 4 and, in addition, a third control unit 5. The first control unit 3 is connected to the second control unit 4 by a first connecting path 6. Furthermore, the first control unit 3 according to the exemplary embodiment is also connected to the second control unit 4 by a second connecting path 7.

The first control unit 3, the second control unit 4 and/or the third control unit 5 may be in the form of a control device or network switch, for example. The second control unit 4 and the third control unit 5 are connected to one another by a third connecting path 8.

According to the exemplary embodiment in FIG. 1a, the first control unit 3 and the second control unit 4 are connected to one another directly by way of the first connecting path 6, whereas the first control unit 3 and the second control unit 4 are connected only indirectly by way of the second connecting path 7, since the second connecting path 7 is divided into two parts by a further control unit. According to another exemplary embodiment, the second connecting path 7 can also connect the first control unit 3 and the second control unit 4 to one another directly, however.

Generally speaking, the method is suitable for detecting errors in the synchronization.

Figure 2:
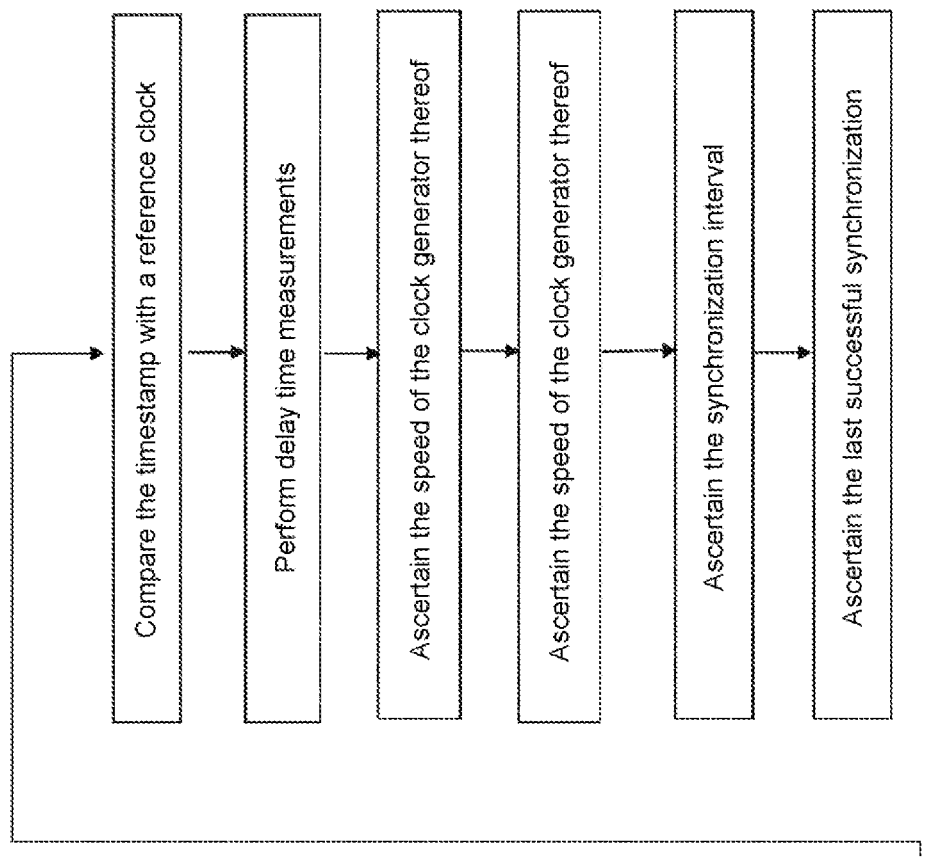
FIG. 2 shows a complete sequence for the method and the determination of the current time of the node to be examined and the clock generator properties thereof.

As shown in FIG. 2, it is possible to calculate or determine the duration of asynchronism, or the time at which and the last time that synchronization was performed correctly. On the basis of an existing synchronization, the method proposes ascertaining the inaccuracy of the clocks in the network, e.g. of the "my" neighbor ECU or of the "neighbor" CPU, which may be located within the same ECU. On the basis of these ascertained data, a timestamp of this component, in conjunction with "my" own clock or that of the grandmaster, and the synchronization interval can be used to calculate how much time has passed since the last synchronization. It is thus possible to ascertain when the last successful synchronization took place. At a time that is also called the determination time, a timestamp from an ECU of a control device for which it is desirable to know whether it is still in sync is recorded. A series of parameters are then taken as a basis for ascertaining for how many synchronization intervals, or since what time, this component has no longer been successfully synchronized, as is visualized by way of example in FIG. 4.

The method thus determines when the last successful synchronization of a node took place and thus also for how long the node has no longer been synchronized. This is the basis for deciding whether or not the sensor data are trustworthy and therefore usable.

Figure 4:
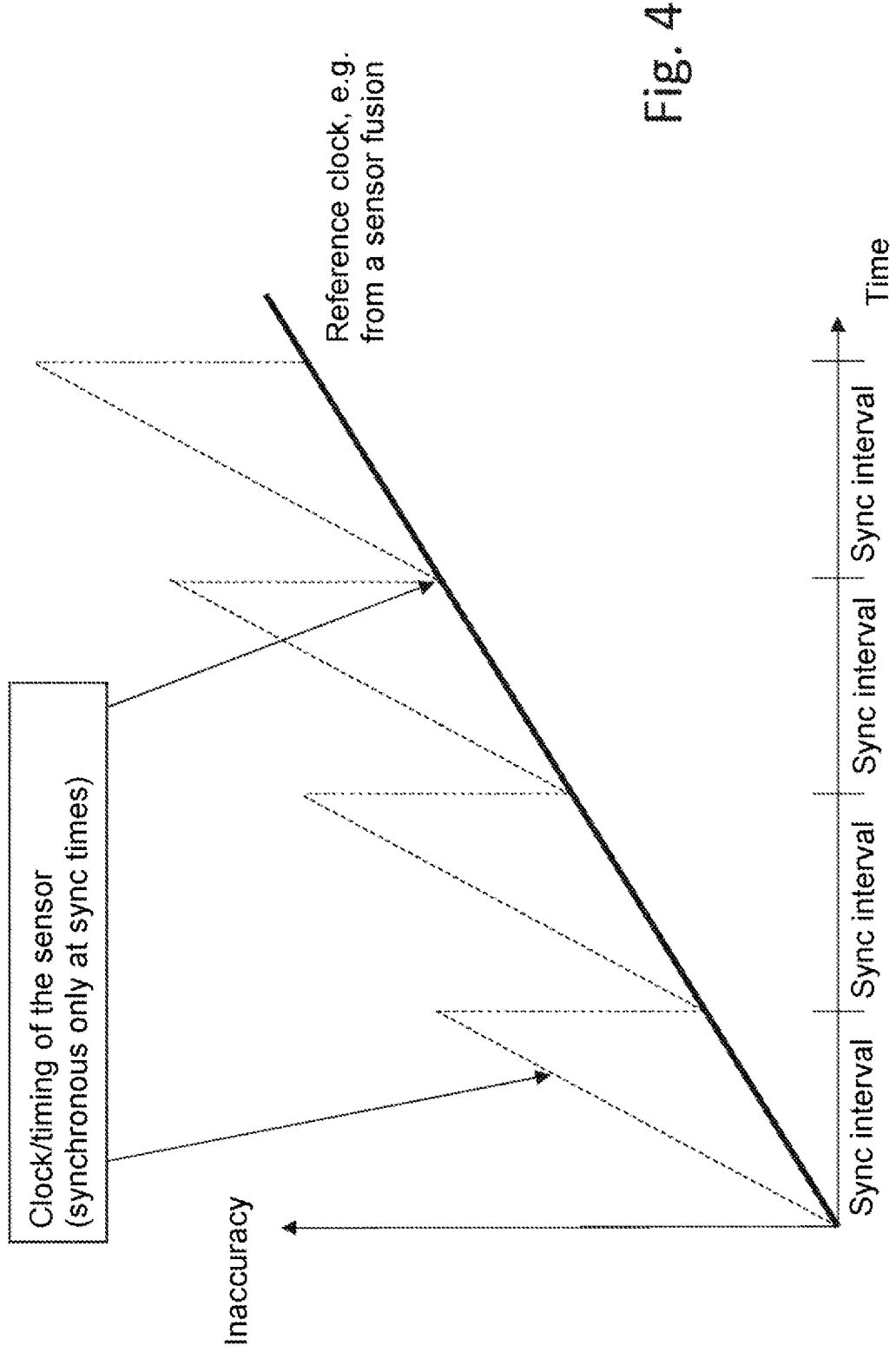
FIG. 4 shows a representation of a sawtooth model of a frequency drift when time synchronization is successful.
Figure 5:
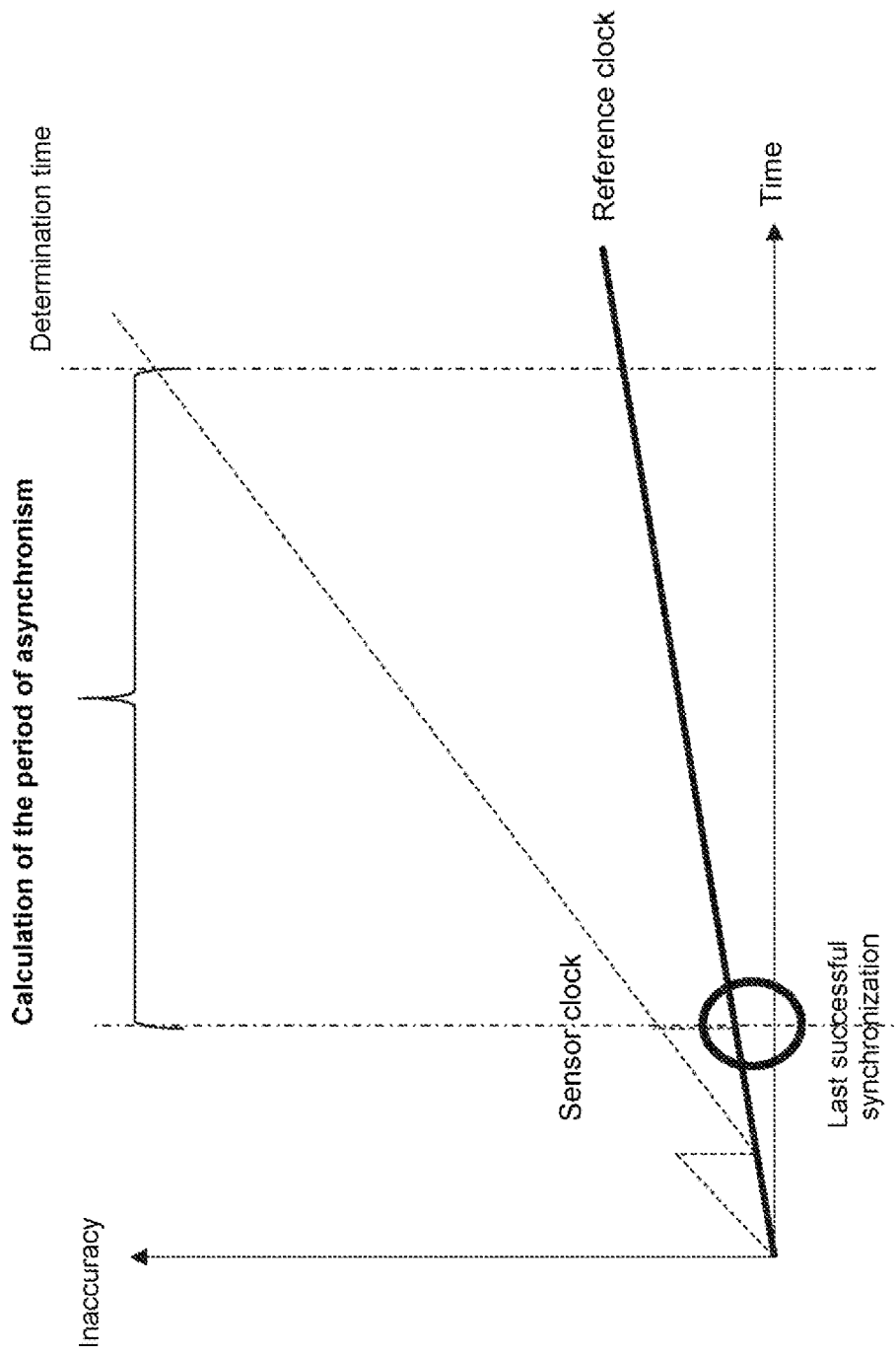
FIG. 5 shows a graphical representation of the calculation of the period of asynchronism.

FIG. 4 generally illustrates the synchronization of a message-based time synchronization. After synchronization messages arrive, the internal clock or the offset is adjusted. The clock then continues to run with its own characteristics until the next synchronization.

As can be seen from FIG. 2, the method begins by asking the node, or a µC or switch or the entire ECU or the control unit 3, 4, 5, about its time or by reading the latter by means of a timestamp. This value is stored. The method then determines the frequency drift of the timer by means of the 802.1AS protocol (Pdelay query). In this way, cyclic messages, which actually serve to measure the delay time and are transmitted anyway, are used to calculate the speed at which the clock generator of this ECU/µC or the entire ECU or a control unit 3, 4, 5 operates.

Figure 3:
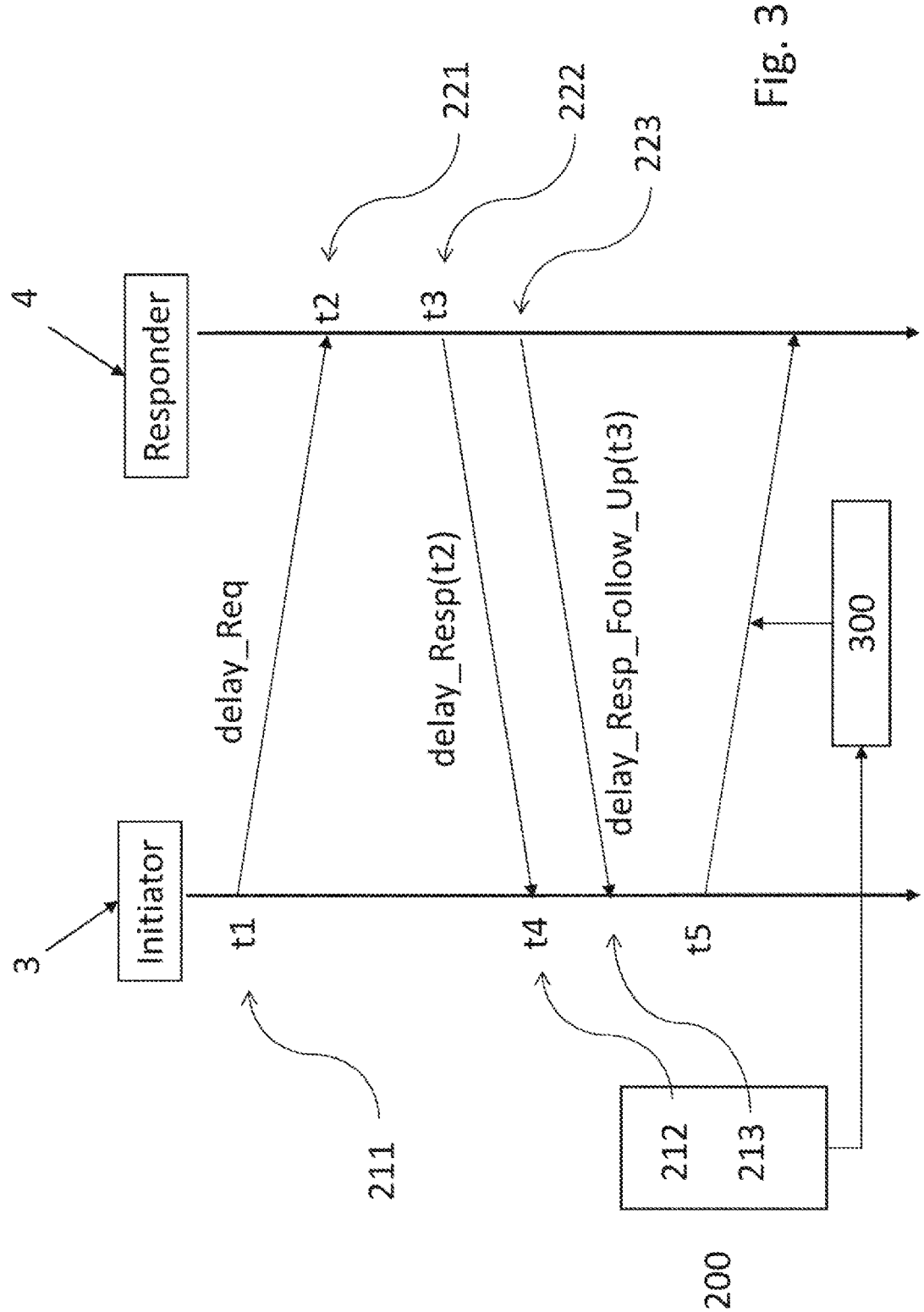
FIG. 3 shows a flowchart for the encryption of the time synchronization messages for determining a type of a transmission medium of the respective connecting path.

The procedure according to the sequence from FIG. 3 is used for measuring delay time. One port, the initiator, starts the measurement by sending a Delay_request message to the port to which it is connected, the responder, and generating an exit timestamp t1. This exit timestamp denotes a hardware timestamp that is written as late as possible on leaving the Ethernet transceiver. When this packet arrives, the responder generates a timestamp t2. In response, the responder sends a Delay_Response message. In this message it transmits the reception timestamp t2 for the Delay_Request message. When this message leaves the responder, the responder in turn generates a timestamp t3, which is sent out in an immediately subsequent Delay_Response_Follow_Up message. When the initiator receives the Delay_Response message, it generates a timestamp t4. The initiator can use the four timestamps t1 to t4 to calculate the average delay time for the routes covered.

PTP defines a master/slave clock hierarchy with a best clock within a network. The time base for the nodes in this network is derived from this clock, the grandmaster. The Best Master Clock Algorithm (BMCA) is used to determine this clock type and to announce this information in the network. IEEE 802.1AS compatible systems cyclically send Announce messages to their neighboring nodes with information about the best clock in the cloud. The recipient of such a message compares this information with the features of its clock and any messages already received from another port. A time synchronization spanning tree is set up on the basis of these messages. During this process, each port is assigned one of four port statuses. The port that has a shorter path to the grandmaster than its link partner is provided with the "master port" status. The "slave" status is assigned when no other port at this node has this status yet. Disabled is selected by the port that cannot fully support the PTP protocol. The "passive" status is selected if none of the other three statuses apply.

Finally, the time information is exchanged by way of the Sync_Follow_Up mechanism. The master ports cyclically send Sync and Follow_Up messages to the neighboring link partner. When the sync message leaves the master port, a timestamp is generated, which is immediately transmitted in a subsequent Follow_Up message. This timestamp corresponds to the current time of the grandmaster at the time at which the sync message was sent. The messages originating from the grandmaster are not forwarded, but rather regenerated in each node, including the switches.

Figures 6A, 6B:
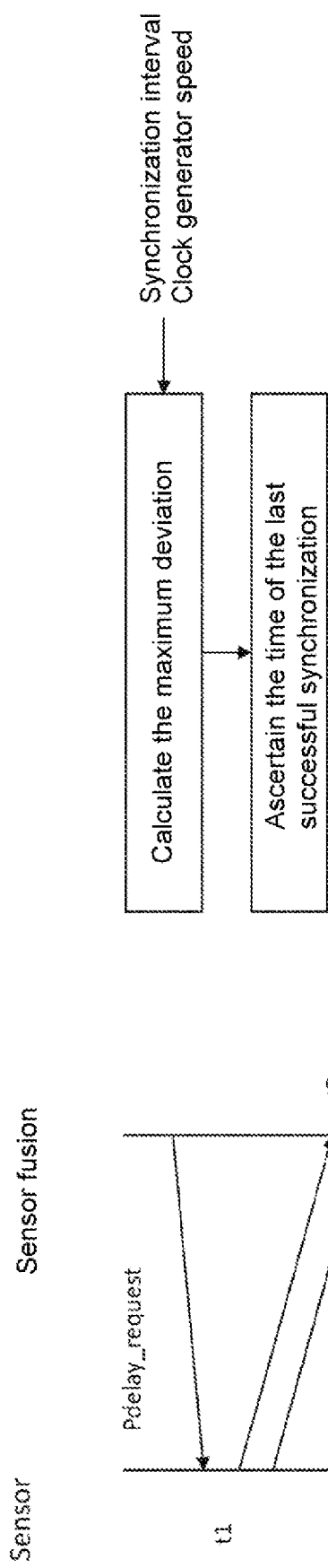
FIG. 6a shows a sequence for the determination of an offset of a sensor for a sensor fusion.
FIG. 6b shows the ascertainment of the time of the last successful synchronization.
Figure 7:
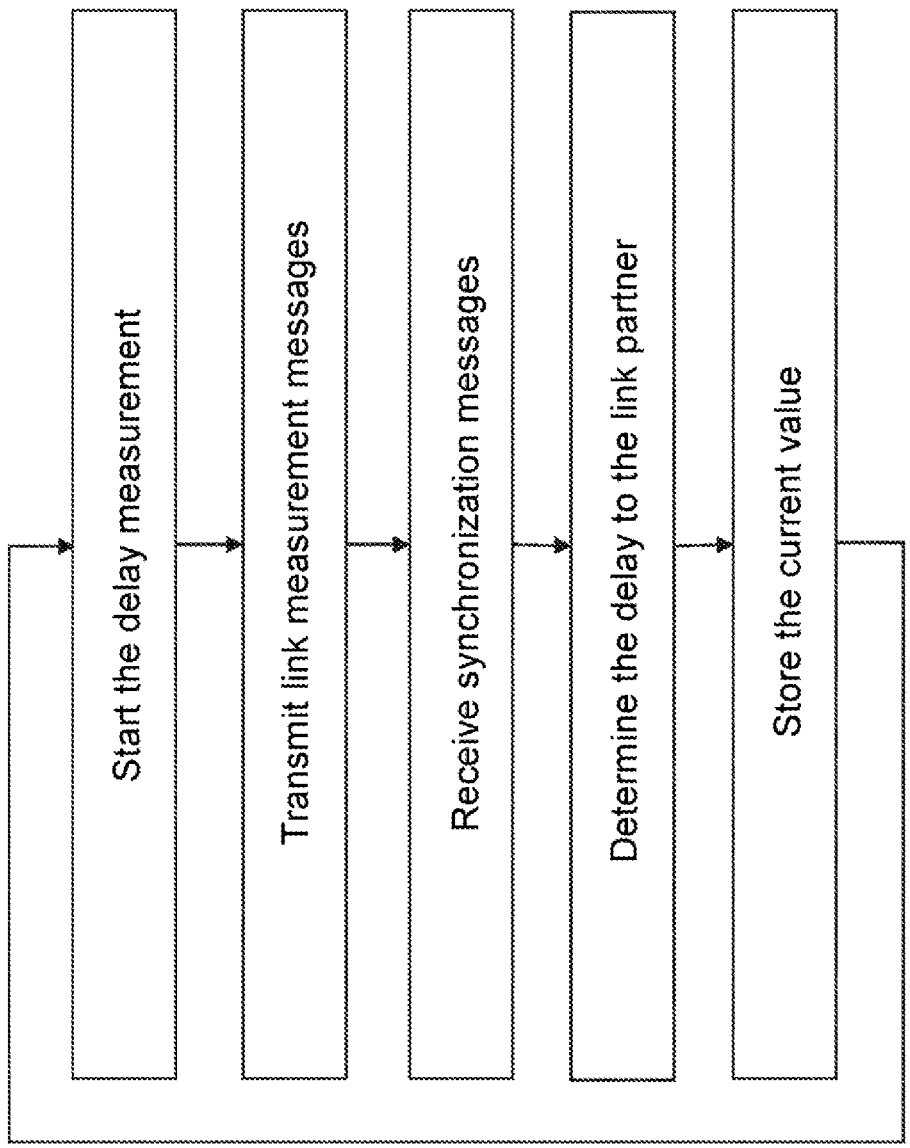
FIG. 7 shows a flowchart for the determination of the individual crystal frequency.
Figure 8:
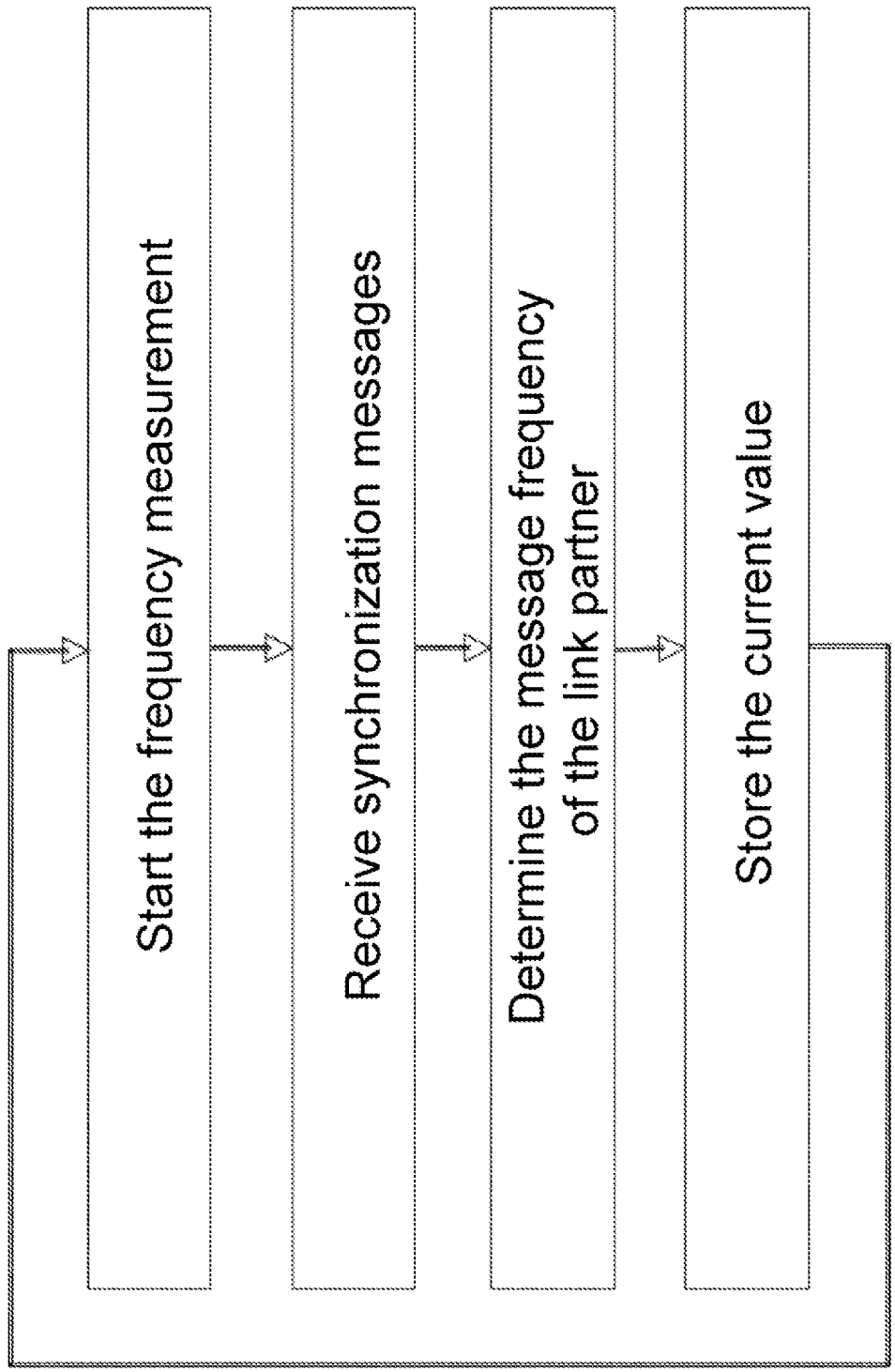
FIG. 8 shows a flowchart for the calculation of the key and for the sending of the messages.
Figure 9:
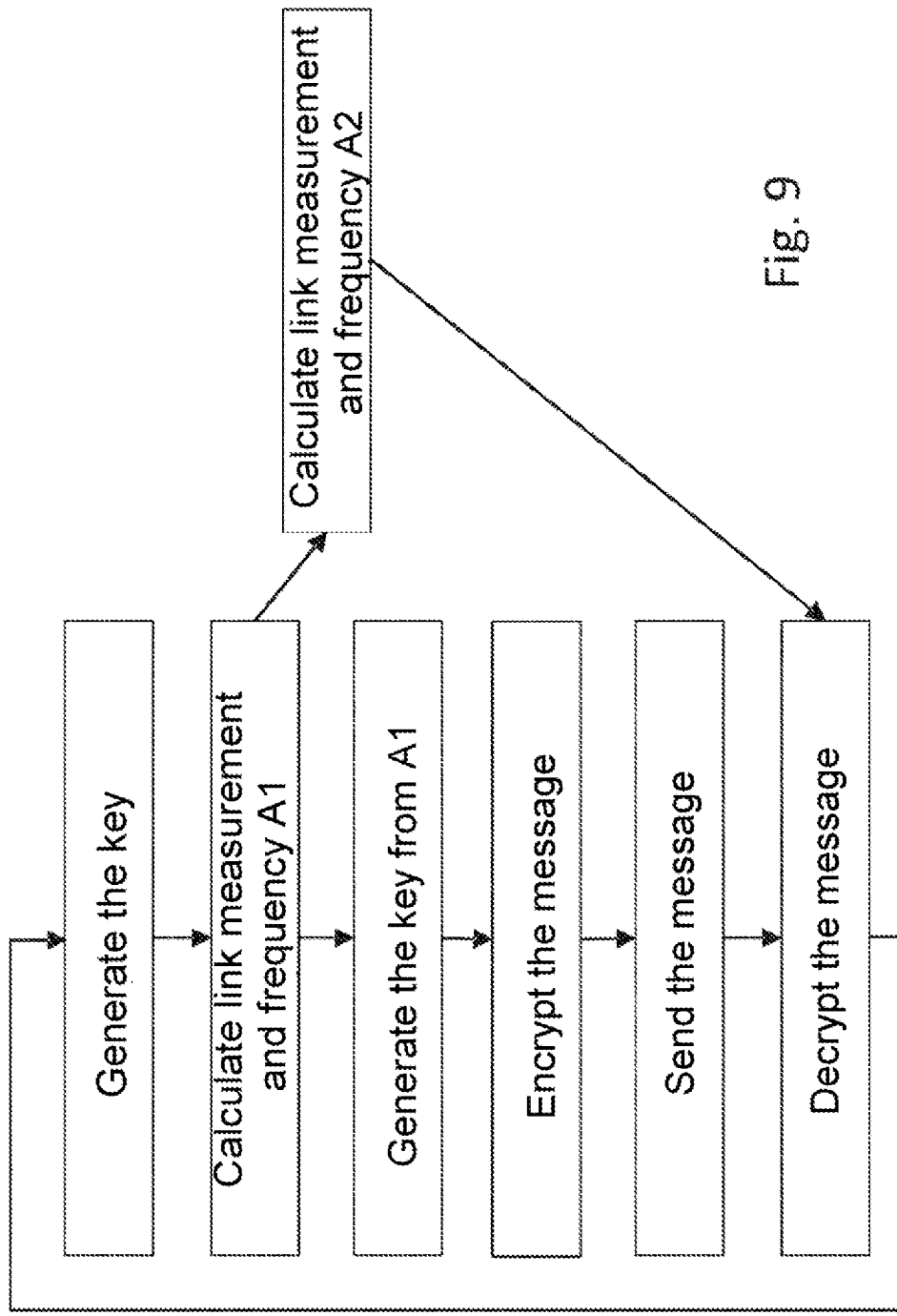
FIG. 9 shows a flowchart for the use of a key over time.

As indicated in FIG. 6a, the speed of the clock generator can be ascertained or calculated using the PTP NRR (neighbor rate ratio) method. Cyclic PDelay messages are used to calculate the speed (offset) of the clock generator in relation to the reference clock. The read or queried time (Tsuspect) is assigned to the current system time (Treference), thus the time that is trusted, either the grandmaster or the time for which the data are important. If the component to be examined is a sensor, then the sensor fusion time could be used as reference. This means that the difference between the two times is ascertained first.

$$Tdeviation = Treference - suspect$$

The synchronization frequency can first be used to calculate how large Tdeviation should be at most: In the case of Ethernet, the interface between PHY (transceiver) and MAC is the definitive interface for recording the time information. This interface (xMII) is clocked at a nominal frequency f of 25 MHz. Crystals for automotive Ethernet AVB/TSN compatible implementations must not exceed a maximum inaccuracy of ±100 ppm. Thus, the worst possible crystal in connection with the interface causes a frequency deviation of 5 kHz in relation to the nominal frequency f according to the formula:

$$df = (f * fo)/10^6$$

The change in the period between the maximum (25002500 Hz) and the minimum frequency (24997500 Hz) is 8 ps for a period duration of 40 ns. This means that in 40 ns two crystals (and thus two ECUs) can have a maximum time difference of 8 ps at +25C. Exactly 3125000 periods of 40 ns each are possible in the standard synchronization interval of 125 ms, which corresponds to a maximum deviation of 25 μs.

According to the IEEE802.1AS specification, the synchronization interval can be between 31.25 ms and 32 seconds. This means a worst case deviation of 6.25 μs for the smallest interval and of 6.4 ms for the largest interval.

FIG. 6b schematically indicates how the method uses the preceding formula to calculate when the last synchronization took place, by ascertaining the speed of the clock generator and knowledge of the synchronization interval Tdeviation.

In the exemplary embodiment of the Ethernet onboard network 2 that is shown in FIG. 1b, the first control unit 3, the second control unit 4 and the third control unit 5 have. Furthermore, the Ethernet onboard network 2 also has the first connecting path 6, the second connecting path 7 and the third connecting path 8. According to the exemplary embodiment, a delay time 9 of a first signal 10 on the first connecting path 6 is determined. The delay time 9 describes the length of time for which the first signal 10 is in transit from the first control unit 3 to the second control unit 4, or vice versa, via the first connecting path 6. A maximum speed 11 of the first connecting path 6 is determined on the basis of the delay time 9 of the first signal 10. The maximum speed 11 of the first connecting path 6 varies in this case depending on the length of the cable, the speed of the transmission and/or the media type, or the type of the transmission medium, for example. A type of a transmission medium 12 of the first connecting path 6 is determined on the basis of the maximum speed 11.

According to this exemplary embodiment, the type of the transmission medium 12 is determined as optical, copper or wireless. In the case of optical, the first connecting path 6 is in the form of an optical fiber connection, for example. In the case of copper, the first connecting path is formed, for example, by cables having twisted pairs of wires, for example an unshielded twisted pair (UTP) cable. In the case of wireless, the first connecting path 6 is substantially in the form of a radio link and the first control unit 3 and/or the second control unit 4 has/have a radio receiver and/or a radio transmitter, or is/are connected thereto.

The control unit 3 ascertains a delay time for the data transfer via the onboard network to the control unit 4. The important factor is that the delay time is ascertained in some form on the basis of an actual physical condition of the transmission path from the first control unit 3 to the control unit 4, i.e. there is a physical condition or property of the transmission path that, when it changes, results in a change in the ascertained delay time.

In this case, one control unit 3 ascertains a delay time for the data transfer via the network to the control unit 4. This can be done in an alternative way. For example, the delay time may occur in the course of a time synchronization between the first subscriber and the second subscriber, for instance according to the time synchronization standard IEEE 802.1AS and the PTP protocol contained therein. The "delay request" and "peer delay" messages implemented within the scope of this protocol can thus be used as data packets, for instance. However, the method is not restricted to this. The important factor is only that the delay time is ascertained in some form on the basis of an actual physical condition of the transmission path from the first subscriber/control unit 3 to the second subscriber/control unit 4, i.e. there is a physical condition or property of the transmission path that, when it changes, results in a change in the ascertained delay time.

Furthermore, the first control unit 3 ascertains the message frequency, which in principle is derived from the speed of the PLL and crystal, of the opposite control unit 4. From these two values, which change constantly due to temperature, aging, etc., the control unit 3 derives a key for encrypting these time messages.

The time synchronization messages are encrypted using the generated dynamic key, which, expressed in general terms, can be derived from individual parameters relating to the connection partner.

As shown in FIG. 3, an individual and constantly changing key is additionally generated on the basis of the line delay 221 and the message frequency 213. This key is unique per unit time and also different per link. As a result of this approach, there is no key twice in the network. Generating the keys from the combination of point-to-point line delay and the frequency of the crystal makes the key particularly resistant to attempts to circumvent it, since firstly the key is constantly changing and secondly it will be different on each link in the vehicle network.

The two values can either be used directly in combination or can be expanded by other static values, which must be known to both control devices, such as for example the address, in order to generate the keys. The respective control unit, the method being able to be executed on both control units, or subscribers/link partners, ascertains a random value therefrom in order to obtain the individual key for the encryption, which key is valid only for a short time. The key changes again and again, based on the preceding measurements, which do not represent any additional effort, since they are used for time synchronization.

The type of the transmission medium 12 is communicated to a program 13 in the Ethernet onboard network 2. The program 13 may be present, for example, in the first control unit 3, the second control unit 4 or the third control unit 5 or a further control unit of the Ethernet onboard network 2. The type of the transmission medium 12 is taken as a basis for adapting a connecting path selection 14. As such, the program 13 can use the connecting path selection 14, for example, to send data by way of a different connecting path than before the connecting path selection. However, the program 13 can also interrupt the sending of data by way of the connecting path selection 14, for example, and can resume it at a later time.

According to the exemplary embodiment, a transmission security value 15 is assigned to the first connecting path 6 on the basis of the type of the transmission medium 12. The transmission security value describes a probability of loss of data transmitted by way of the connecting path. That is to say that the transmission security value 15 permits a statement about how reliably the data can be transmitted by way of the first connecting path. This is supplied to the entropy source 200. If a security limit value is not reached, for example, and the data can be transmitted only in nonsecure fashion, then it must be expected that the data will reach their destination with a delay or, if it is not worth sending the data again on account of the requirement for the data to be up to date, will not reach their destination at all.

According to a further exemplary embodiment, delay times of a plurality of signals on the first connecting path 6 are determined and the fastest delay time of the plurality of signals is selected. The maximum speed 11 of the first connecting path 6 is then determined on the basis of the fastest delay time.

A control unit starts the delay measurement and waits to receive the link partner messages. Based on reception of the messages using the PTP example, the line delay can be measured. If one link partner starts the delay measurement, the other link partner will inevitably notice this and should also start a measurement so that these two measurements can also generate a related measured value.

The type of the transmission medium 12 for the second connecting path 7 and/or the third connecting path 8 can also be determined analogously to the approach described above.

The respective recorded values are different, remain secret and stored in the control device each time and are also not transmitted over the network—nor do they have to be. Discovery of the key by mere trial and error is sufficiently improbable. An individual key is generated by taking the two values into account. First, the frequency of each crystal is different, and second, the line delay of each link is different. Here, two fluctuating values are added together, giving a third value—the value of the key—that is even harder to guess. The line delay may typically be in the range of 50-500 nanoseconds and the frequency is a parameter and is given in +/− ppm. The round-trip line delay is based on the same channel, which is why the calculated values on both sides of the link are identical. The parameters therefore do not have to be exchanged. This means that both partners have the same values for generating the key at almost the same time. One link partner encrypts using these two values resulting from the last measurement and the other link partner decrypts using its last values.

There is thus also provision for a delay time 16 of a second signal 17 on the second connecting path 7 to be determined. A maximum speed 18 of the second connecting path 7 is then determined on the basis of the delay time 16 of the second signal 17. A type of the transmission medium 19 of the second connecting path 7 is in turn determined on the basis of the maximum speed 18 of the second connecting path 7.

It is advantageous to use the current key A1 as long as no new line measurement is carried out. In this way, the link partner always knows which key to use if no new line measurement has been initiated beforehand. A new key should/can be either generated cyclically, e.g. predefined frequency, or started as required, by a trigger or always directly before important messages are sent.

Both the first control unit 3 and the second control unit 4 and also the third control unit 5 can be operated in a normal operating mode or in an energy-saving mode. In the energy-saving mode, the respective control unit consumes less energy than in the normal operating mode. For example, in the energy-saving mode, the speed of a port of the respective control unit can be reduced in comparison with the speed in the normal operating mode. The reduced speed of the port then also has an effect on the respective maximum speed of the respective connecting path.

According to a further exemplary embodiment, a service message 20 can be sent from the first control unit 3 to the third control unit 8. The determination of a delay time 21 of a third signal 22 is then triggered by the service message 20. The third signal 22 is sent between the second control unit 4 and the third control unit 5. According to the exemplary embodiment, the delay time 21 of the third signal 22 is determined by the third control unit 5.

Figure 10:
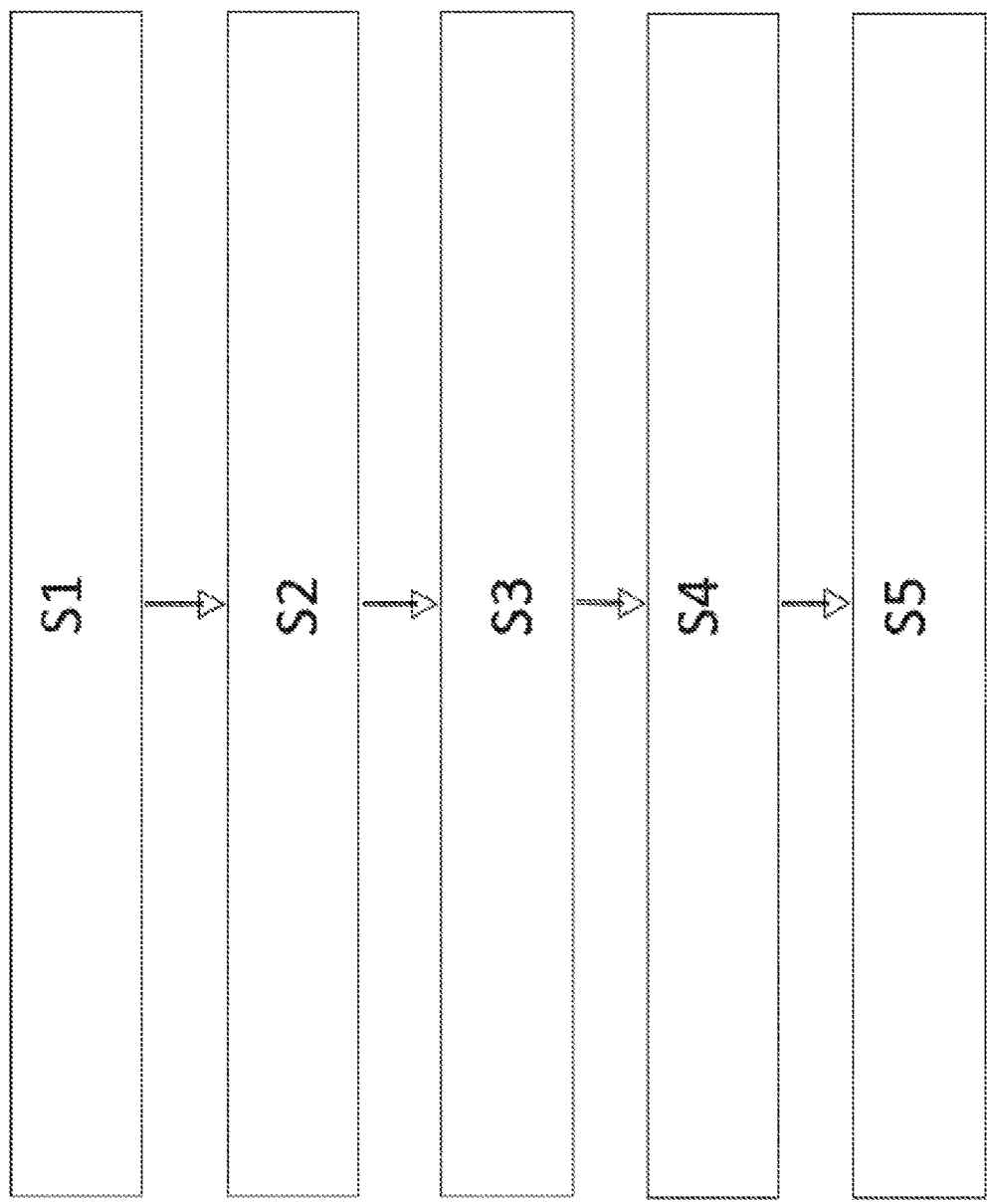
FIG. 10 shows a flowchart for the adaptation of a program in the Ethernet onboard network.
Figure 11:
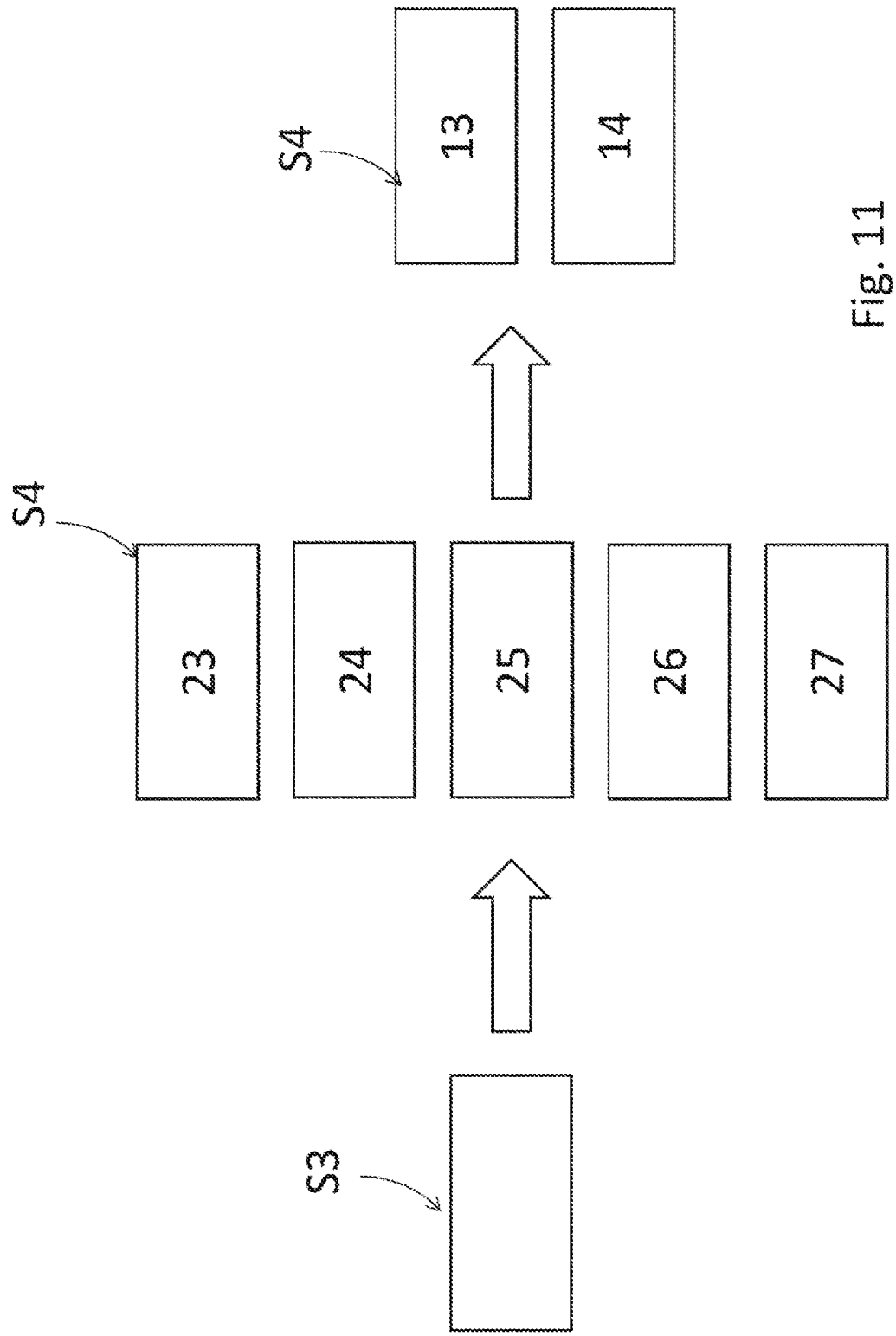
FIG. 11 shows a flowchart for the adaptation of a program in the Ethernet onboard network.

FIG. 10 provides a general description of the method for determining the delay time. The delay time 9 of the first signal 10 is determined in a step S1. The type of the transmission medium 12 is determined in a step S2. Finally, the program 13 is adapted in a step S3. The delay time 9 of the first signal 10 is determined in a step S4. As a result, the type of the transmission medium 12 can be determined in a step S5. The type of the transmission medium 12 may in turn comprise the following parameters: speed 23, medium 24, cable length 25, power transmission 26, bit error rate 27. Finally, the adaptation of the program 13 and the connecting path selection 14 then follow in a step S6.

According to this example, it is proposed that the delay time of the signals between connected control units or controllers be measured. Methods of the standard IEEE 1588 or IEEE 802.1AS, for example, can be used to measure the delay times 9, 16 and 21. Methods can also be provided by TTEthernet (time triggered Ethernet), for example, in order to determine the respective delay time 9, 16 and 21.

Figure 12:
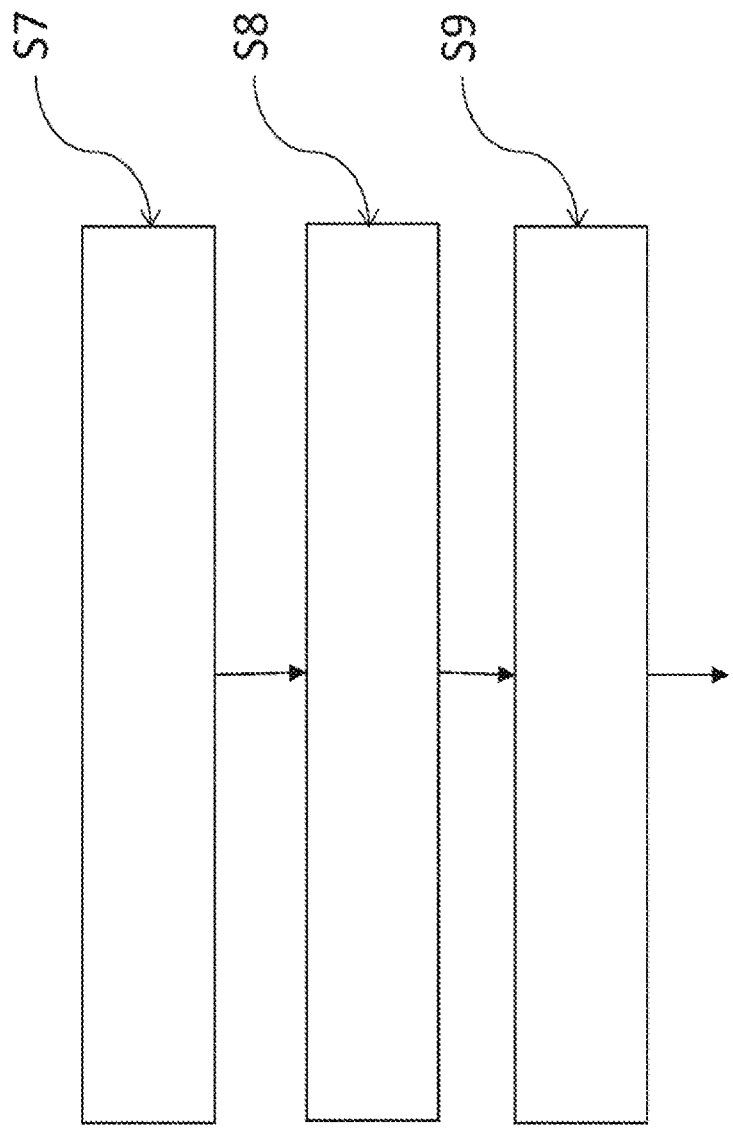
FIG. 12 shows a flowchart for the determination and storage of a delay time of a signal.

FIG. 12 shows the determination of the respective delay time 9, 16 and 21. Local and nonlocal querying of the delay time are described. The program 13, which is executed in particular on at least one control unit, preferably first of all locally determines the local delay time, or the delay times if more than one control unit is directly connected. Other control units are then preferably queried for their delay time to the neighbor by way of a service-oriented method, for example SOME/IP (Scalable Service-Oriented Middleware over IP). This can be implemented either centrally or in a decentralized manner. The querying can either be carried out once, on system startup, definition or after a software update, or can be performed cyclically in order to detect dynamic changes. These data are then stored and assigned the first time, in particular including the addresses of the control units. The respective delay time to the directly connected control units is determined in a step S7. The respective delay times of other connecting paths are queried in a step S8. The respective delay times and the associated connection partners thereof are stored in a step S9.

Figure 13:
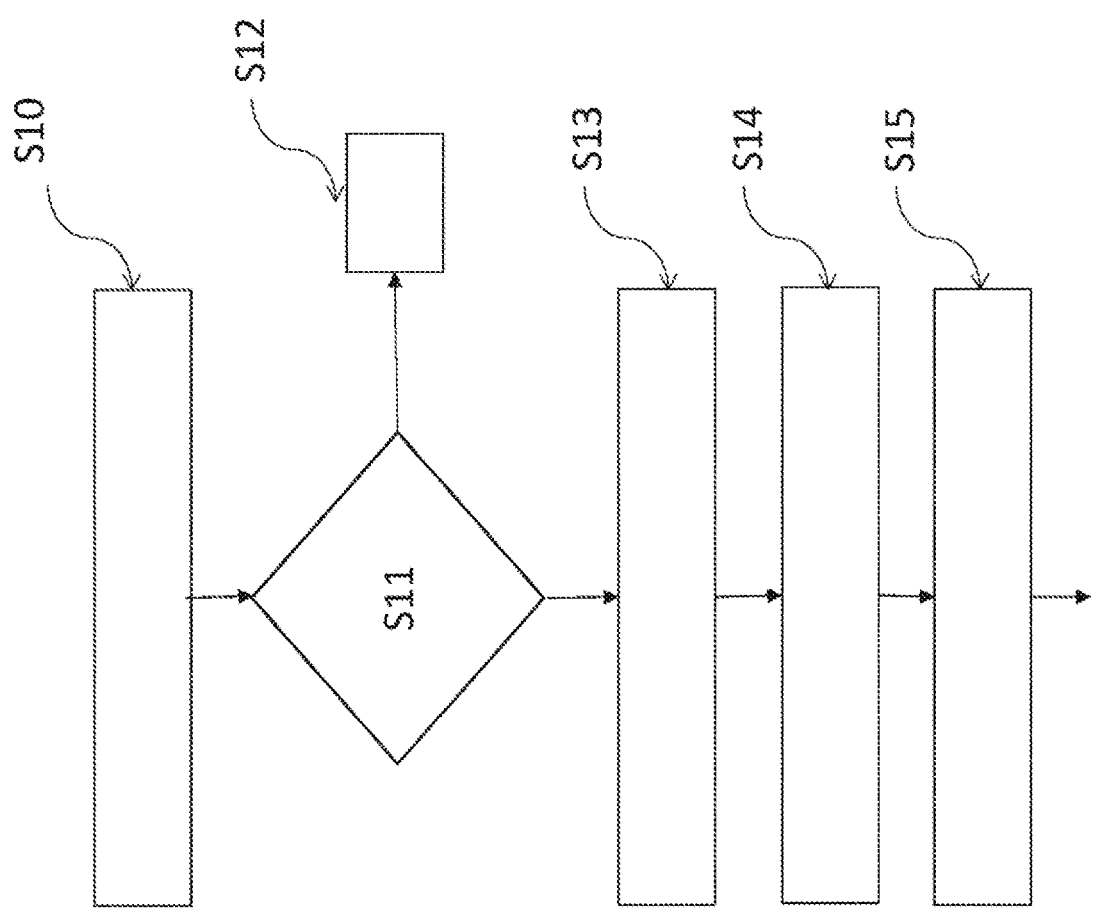
FIG. 13 shows a flowchart for the illustrative adaptation of a program in the Ethernet onboard network.

FIG. 13 shows a further method for deriving the other speeds on the basis of a reference measurement. If, for example, the current temperature is very high or poor cables are used, prestored values may possibly be too inaccurate. It is therefore proposed that the application, or the program 13, itself carries out measurements on its own control unit, in particular in light of its own parameters and other speeds that can then be derived and calculated therefrom. One analysis per local Ethernet port is carried out in a step S10. A test for whether channel parameters are known is performed in a step S11. If this is not the case, a step S12 follows and the method ends. If this is the case, a step S13 follows in which the respective delay time 9, 16 and 21 is determined. The storage takes place in a step S14 and the determined delay time is related to the channel parameters. A list of reference values is created in a step S15.

Figure 14:
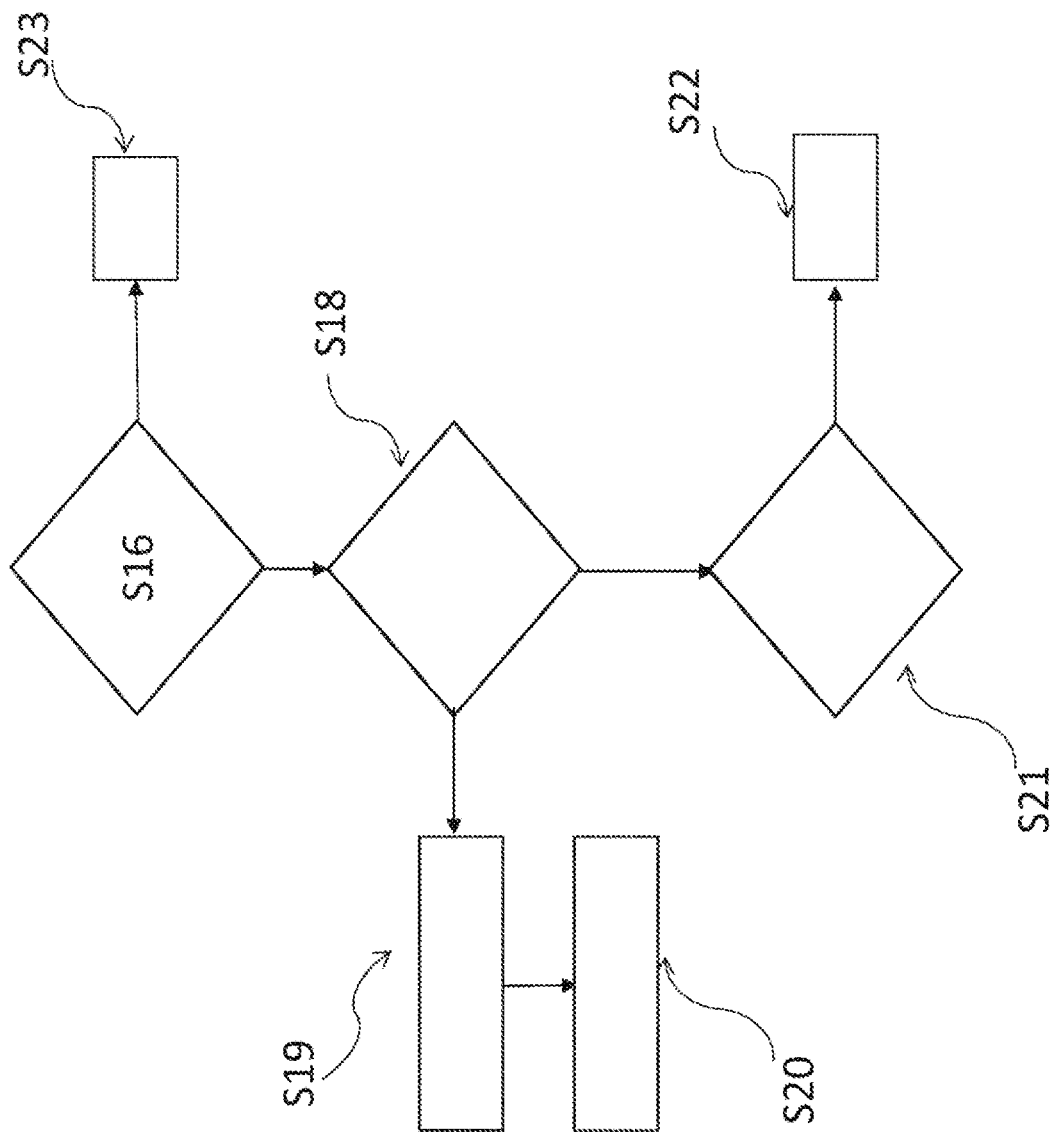
FIG. 14 shows a flowchart for the illustrative adaptation of a program in the Ethernet onboard network.

FIG. 14 shows possible optimization by means of knowledge of the type of the transmission medium 12, 19. A decision is made as to whether the type of the transmission medium 12, 19 is copper in a step S16. If this is the case, a step S17 follows, in which it is confirmed that PoDL (Power over Data Lines), that is to say the supply of power via Ethernet, is possible. If the decision in step S16 is that the medium is not copper, a step S18 follows. A check to ascertain whether the type of the transmission medium 12 is optical is performed in step S18. If this is the case, a step S19 follows. In step S19 it is found that the bit error rate is therefore lower and the reliability of this connecting path is therefore higher. The option of deactivating RX (receiving unit) or TX (transmitting unit) of the control unit 3, 4, 5 if it is not required is provided in a step S20.

If the decision in step S18 is that the medium, or the type, of the transmission medium 12 is not optical, it is assumed in a step S21 that the respective connecting path, as the relevant connecting path, is in the form of a direct MII (Media Independent Interface) connection. In this case, the respective control unit is suitable, for example, for IEEE 802.1CB (Frame Replication and Elimination for Redundancy).

Further options arise from the knowledge of the transmission speed. Combined with the current data streams, data can be deliberately transmitted using a high bandwidth connection, for example, and other connecting paths that are not required can therefore be deactivated, thus making it possible to save energy.

In addition, for high bandwidth connections, there is the option of using redundancy mechanisms (e.g. IEEE 802.1CB). Since the data are continuously transmitted in a redundant manner in this case, a high bandwidth is required for this purpose. It is also conceivable to adapt the application depending on the speed of the transmission path. A camera can adapt the resolution of the image data to be transmitted depending on the speed of the link or connecting path 6, 7, 8, for example.

Figure 16:
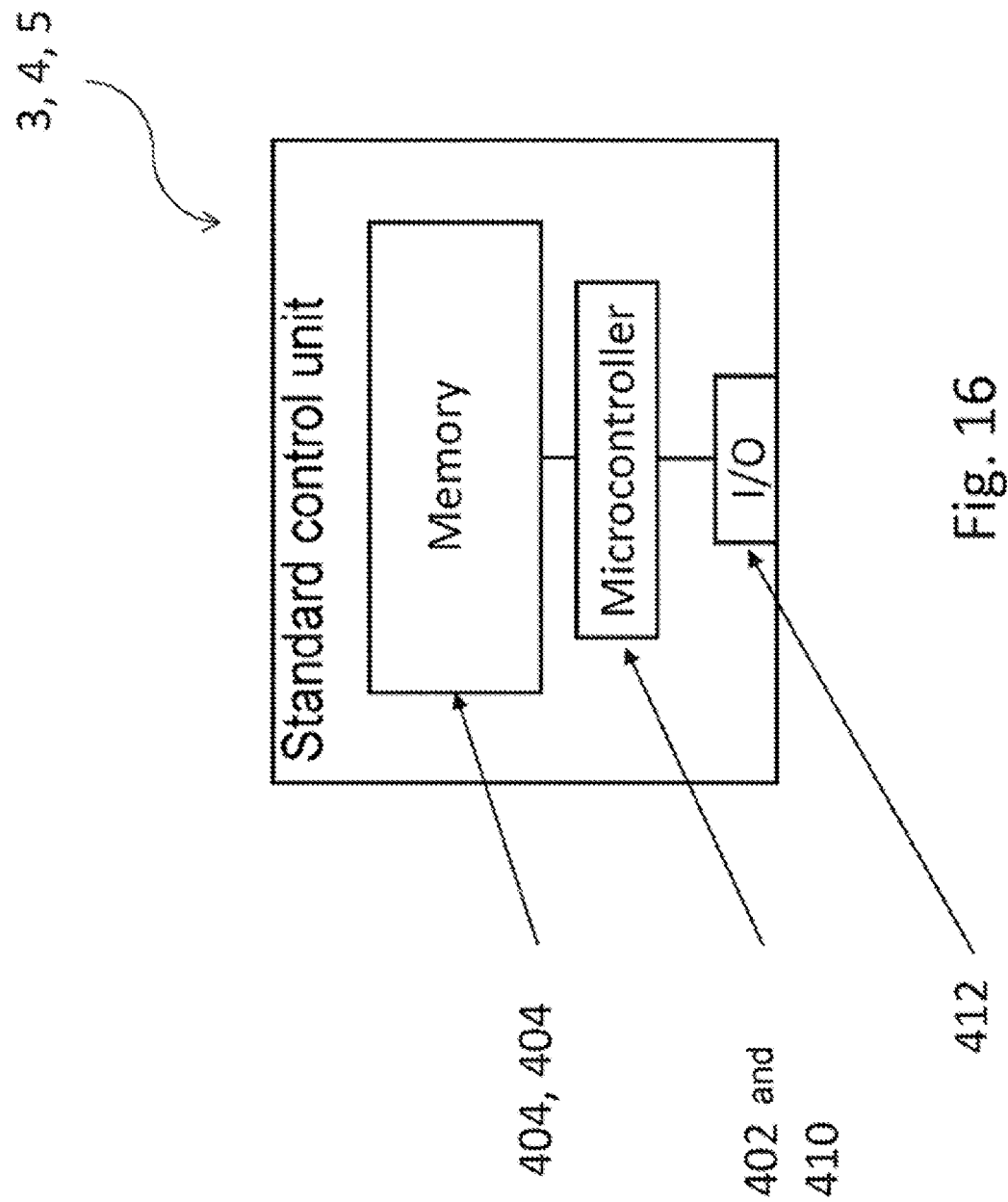
FIG. 16 shows the design of a control unit.
Figure 17:
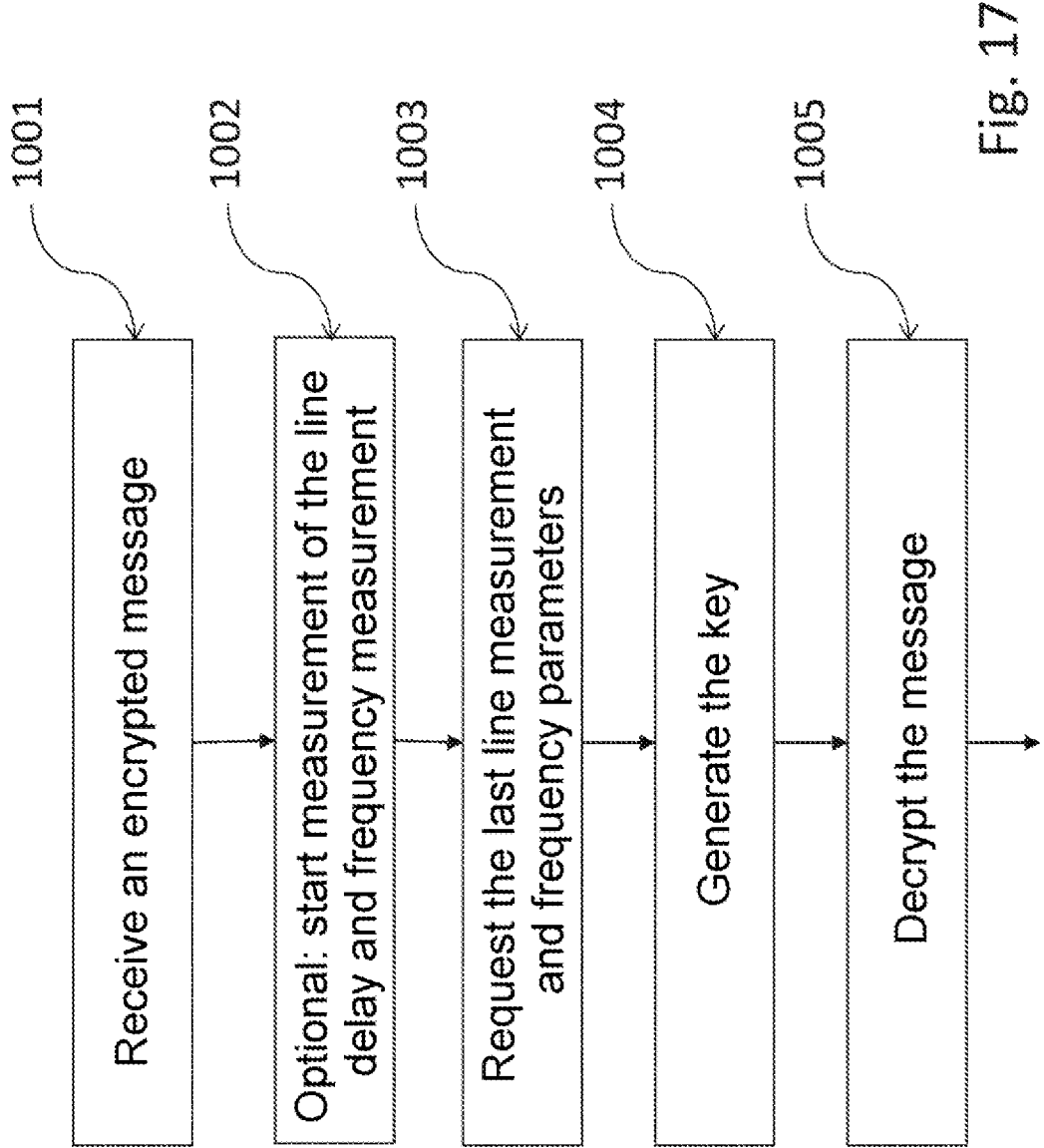
FIG. 17 shows encrypted links with a generated dynamic key from the communication of the control units.

In addition to a microprocessor 402, the control unit 3, 4, 5 in FIG. 16 comprises a volatile and nonvolatile memory 404, 406, two communication interfaces 408 and a synchronizable timer 410. The elements of the network device are communicatively connected to one another by way of one or more data connections or data buses 412. The nonvolatile memory 406 contains program instructions that, when executed by the microprocessor 402, implement at least one embodiment of the method according to the invention and the entropy source is formed in the volatile and/or nonvolatile memory 404, 406, said entropy source then being used to form the dynamic keys 28 for the connecting paths 6. The decoding sequence of the dynamic key during decryption is shown in FIG. 17.

Figure 15:
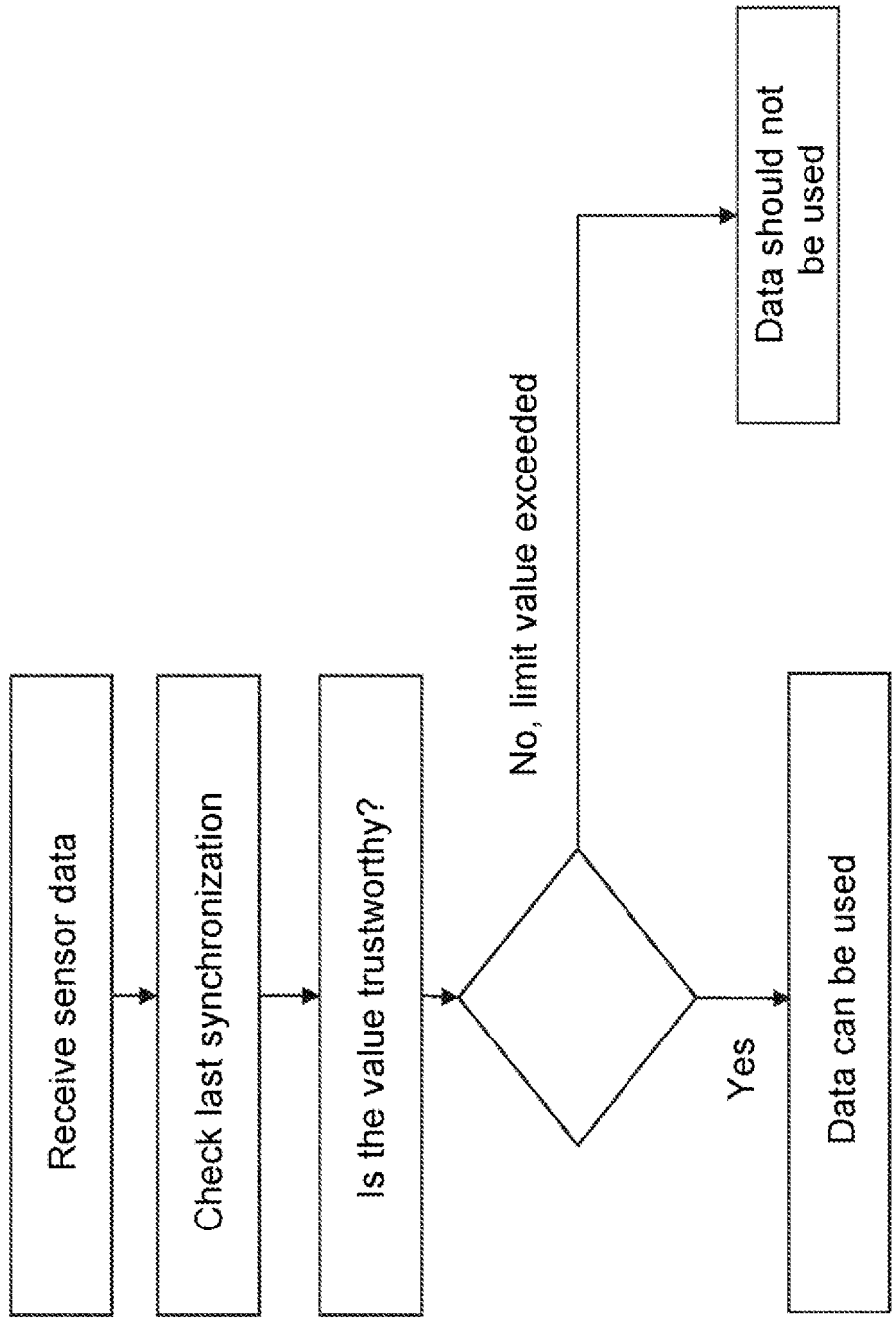
FIG. 15 shows a flowchart for the assessment of the use of received data on the basis of the last successful synchronization time.

FIG. 15 shows how the use of received data is assessed on the basis of the last successful synchronization time thereof. This sequence can be used to ascertain whether the checked data that are about to be stored are also suitable for the respective use. This is particularly advantageous if said data are stored on a data recorder. It is of substantial interest to the data recorder whether the content of the data is also correct. In the event of an accident, it is important whether or not the camera detected the pedestrian, for example. If incorrect data are recorded, or data with an incorrect time, the recording is invalid and cannot be detected as such without the method.

Figure 22:
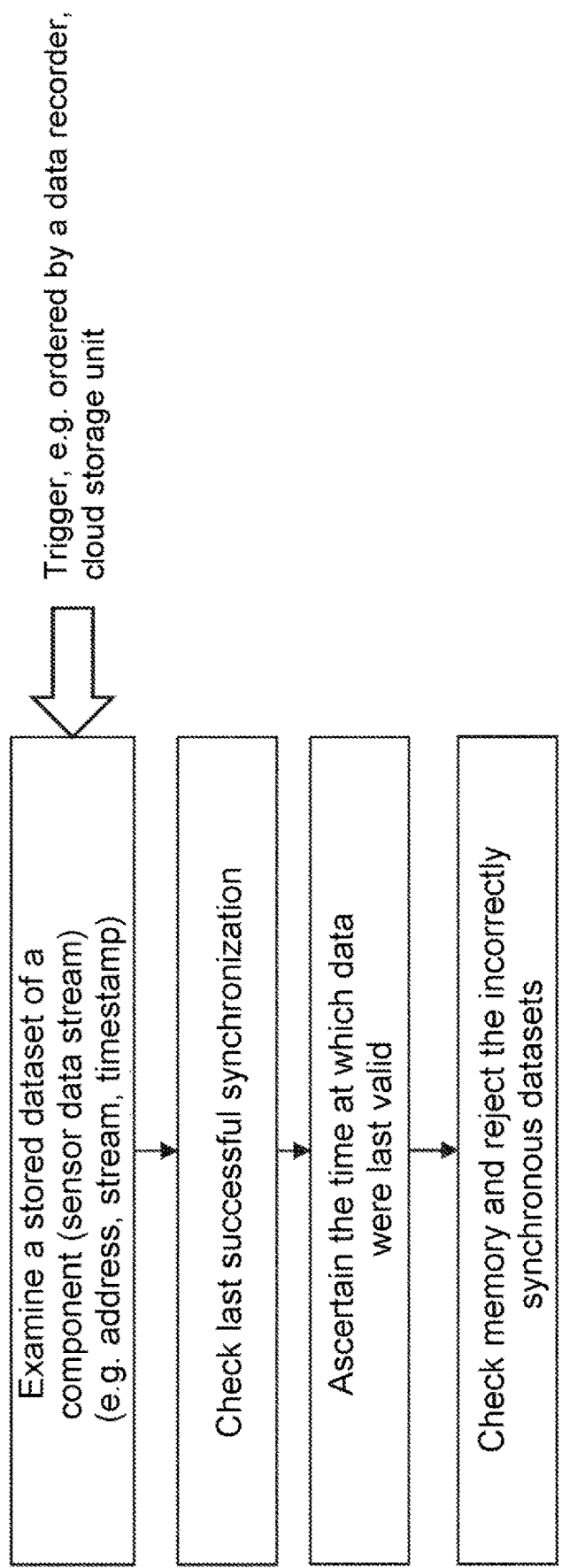
FIG. 22 shows a sequence for the retrospective erasure of data if the synchronization time is above the limit value.

The querying component analyzes a data stream and the sender thereof, as shown in FIG. 22. The method can be taken as a basis for ascertaining when the data were last trusted. The nominal limit values are determined either by the functions, the system manufacturers or the use case as such itself. Said use case may differ per ECU and per use case. Based on this limit value, the data can be categorized as valid, invalid or untrustworthy.

Figure 18:
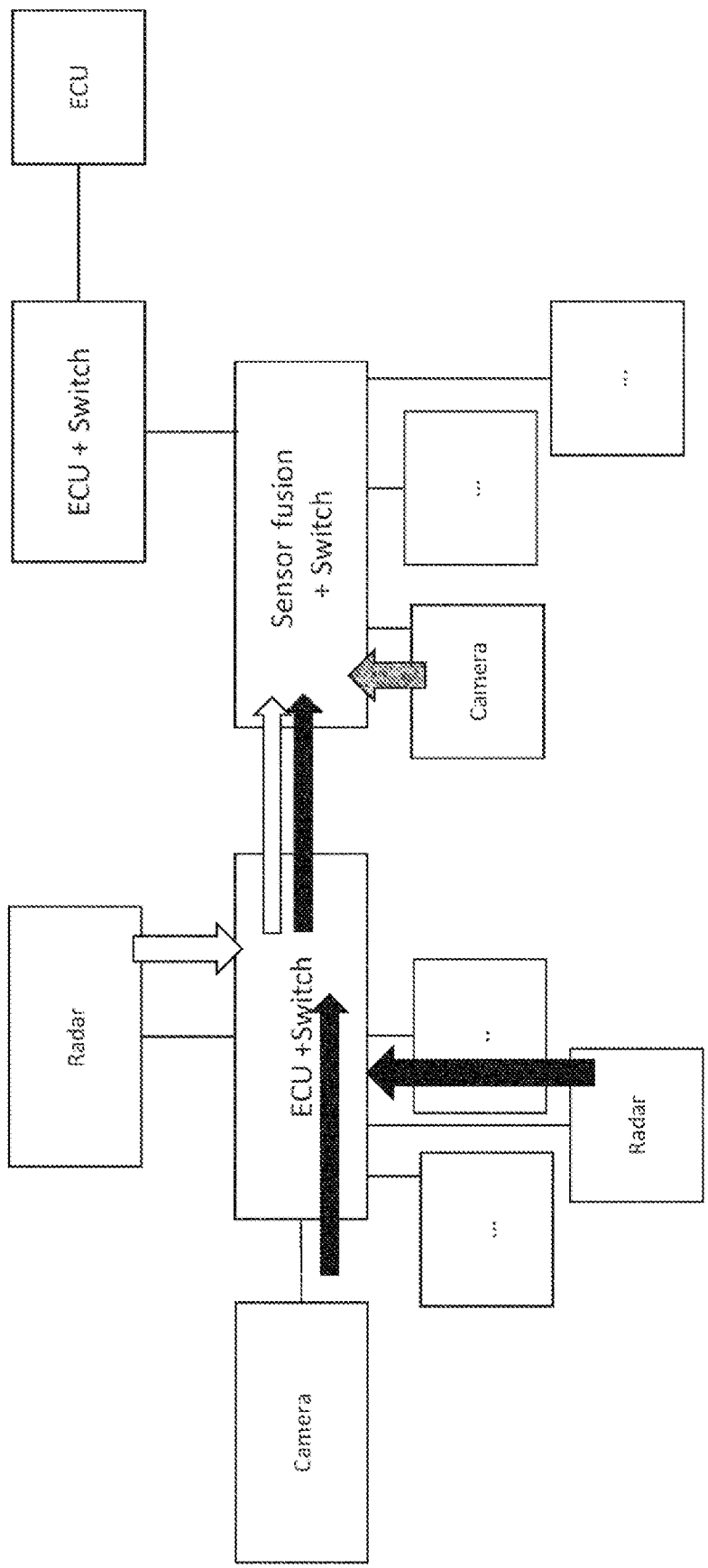
FIG. 18 shows a representation of the use case of a data fusion.
Figure 19:
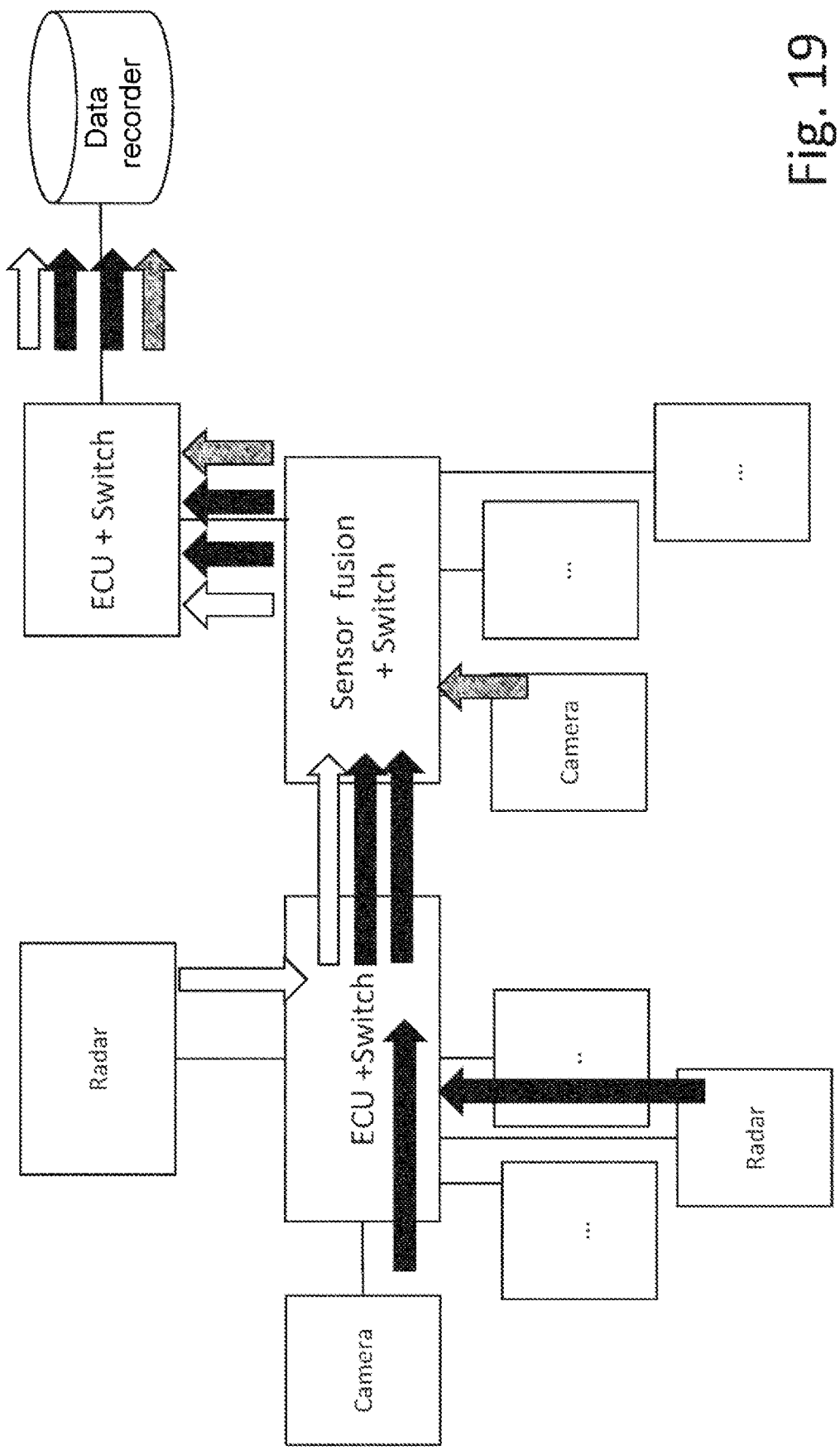
FIG. 19 shows a representation of the use case of a data fusion with a data recorder.

FIG. 18 and FIG. 19 show two use cases in which the time synchronization is of essential importance and the method is used. Firstly, different data from different sensors/control devices need to be fusioned, said data being contained in the sensor message on the basis of the time information, and secondly they can also be stored in order to have evidence in the event of an error.

Figure 20:
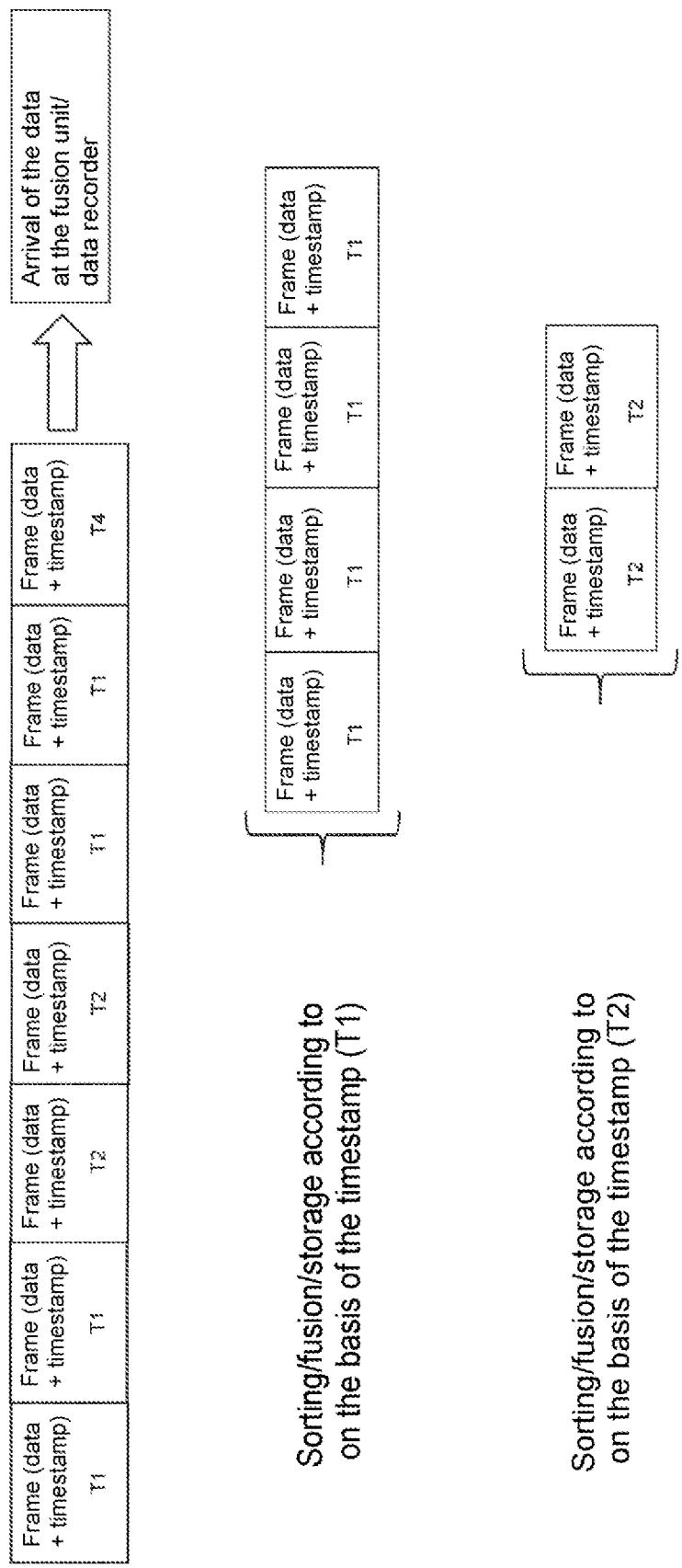
FIG. 20 shows a representation of an assignment of correct data for a data fusion.

FIG. 20 shows that the timestamps in the data are used as a basis for both fusioning and storing the data so that the correct data can be assigned to a time.

Figure 21:
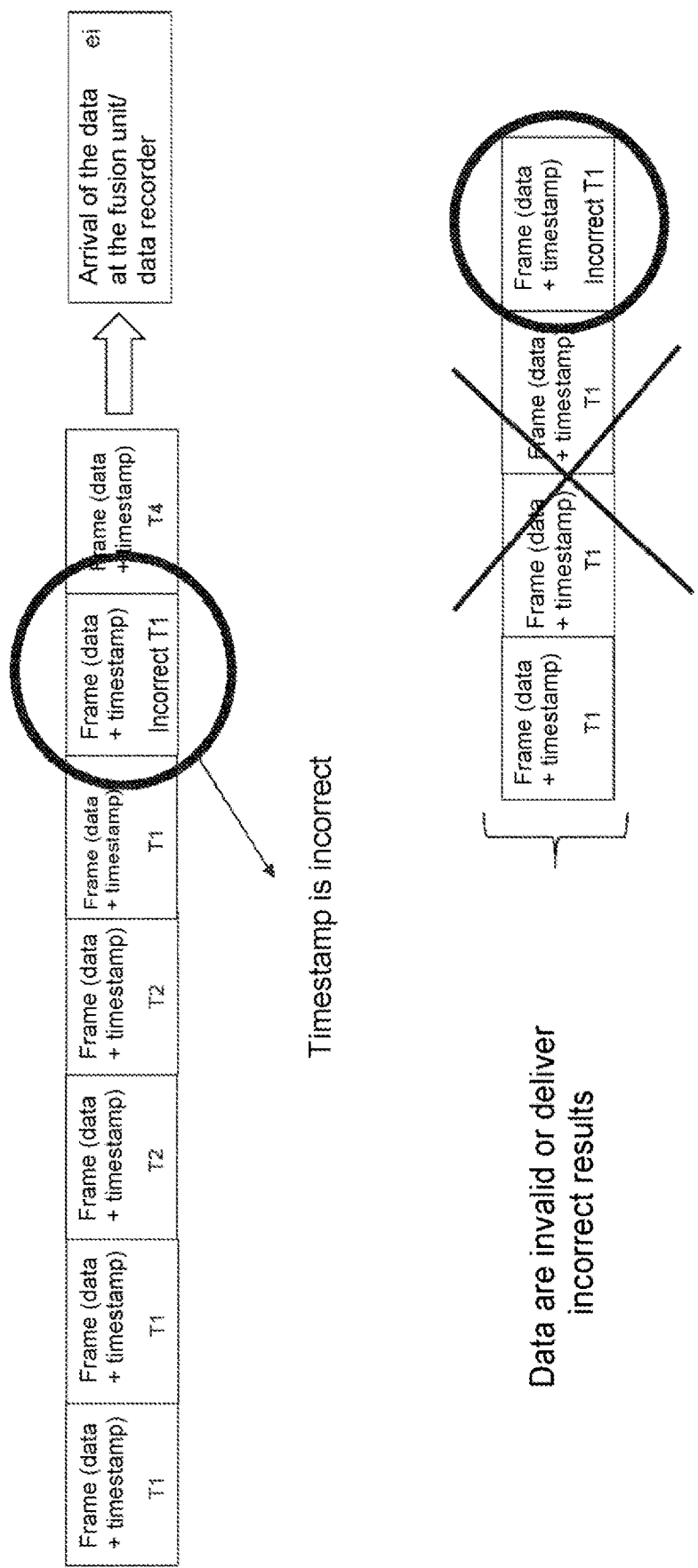
FIG. 21 shows a representation of an erroneous assignment of data for a data fusion.

FIG. 21 shows the arrival of different sensor data frames at a fusion unit or, by way of example, at a data recorder. The latter assigns the data not according to the order in which they arrive, but rather according to their timestamp, which was based on a preceding time synchronization. Since the data in a network have to take paths of different length, sorting is typically based on the creation of these sensor data when they were recorded.

FIG. 21 shows that a timestamp is incorrect, i.e. that an inconsistency has arisen in the sensor data during the fusion, resulting in the time synchronization being erroneous, and wherein the method proposed here was not used. The method improves the precision and accuracy of the clock synchronization for the realtime capability of the Ethernet onboard network. A measure of the quality of a synchronization protocol is above all its achievable synchronization accuracy, which can be derived from the method as additional information.

FIG. 22 shows the sequence for how retrospective erasure of data takes place if the synchronization time is above the limit value. The method is also used if data have already been stored (or are just about to be stored), for example, as in the data recorder use case. It is of substantial interest to the data recorder whether the content of the data is also correct—in the event of an accident, it is important whether or not the camera detected the pedestrian, for example. If incorrect data are recorded, or data with an incorrect time, the recording is invalid. The querying component analyzes a data stream and the sender thereof as indicated in FIG. 22. The method can be taken as a basis for ascertaining when the data were last trusted. The nominal limit values are determined either by the functions, the system manufacturers or the use case as such itself. Said use case may differ per ECU and per use case. Based on this limit value, the data can be categorized as valid, invalid or untrustworthy.

The querying component may be a data recorder, a cloud storage unit, that wants to check an order to examine a stored dataset of a component, such as a sensor data stream. This can be accomplished by checking the address, stream or timestamp, for example. For this purpose, a successful synchronization is checked for the last time, and the time at which data were last valid is ascertained. The memory is checked, and incorrectly synchronous datasets are rejected.

LIST OF REFERENCE SIGNS

1 Motor vehicle
2 Ethernet onboard network
3 First control unit
4 Second control unit
5 Third control unit
6 First connecting path
7 Second connecting path
8 Third connecting path
9 Delay time of the first signal
10 First signal
11 Maximum speed of the first connecting path
12 Type of the transmission medium of the first connecting path
13 Program
14 Connecting path selection
15 Transmission security value
16 Delay time of the second signal
17 Second signal
18 Maximum speed of the second connecting path
19 Type of the transmission medium of the second connecting path
20 Service message
21 Delay time of the third signal
22 Third signal
23 Speed
24 Medium
25 Cable length
26 Power transmission
27 Bit error rate
28 Dynamic key
29 Time synchronization message
200 Entropy source
211 Sending at time t1
212 Reception at time t4
213 Reception at time t4
221 Reception at time t2
222 Sending at time t3
223 Delayed sending at time t3
300 Encrypted message at time t5
400 Control unit
402 Microprocessor
404 RAM
406 ROM
408 Communication interface
410 Timer
412 Bus/communication interface
1001 Receive an encrypted message
1002 Start measurement of the line delay and frequency measurement
1003 Request the last line measurement and frequency parameters
1004 Generate the key
1005 Decrypt the message

The invention claimed is:

1. A method for checking the validity of time synchronization of sensor data of an Ethernet onboard network in a motor vehicle, in which the following steps are carried out:
determining a delay time of a first signal on a first connecting path between a first control unit of the Ethernet onboard network and a second control unit of the Ethernet onboard network;
determining a maximum speed of the first connecting path on the basis of the delay time; and
determining a type of a transmission medium of the first connecting path on the basis of the maximum speed, characterized in that the following steps are carried out:
identifying at least the first control unit of the Ethernet onboard network;
synchronizing at least the first control unit of the Ethernet onboard network;
ascertaining a synchronization interval;
ascertaining a drift of a timer of the first control unit;
ascertaining a timestamp of the first control unit;
reading a timestamp or querying the time of the first control unit;
comparing the timestamp with a reference clock of the Ethernet onboard network;
carrying out a delay time measurement;
ascertaining the speed of an associated clock generator;
ascertaining a time difference of the synchronization interval;
ascertaining a last synchronization.

2. The method as claimed in claim 1, characterized in that the drift of the timer is ascertained via the Institute of Electrical and Electronics Engineers Standard for Local and Metropolitan Area Networks-Timing and Synchronization for Time-Sensitive Applications (IEEE 802.1AS) protocol.

3. The method as claimed in claim 1, characterized in that the comparison of the timestamp with a reference clock of the Ethernet onboard network results in a difference being calculated in the form Tdeviation=Treference−Tsuspect, wherein Tdeviation is the comparison of the timestamp with a reference clock of the Ethernet onboard network, Treference is a sensor-fusion time, and Tsuspect is a read or queried time.

4. The method as claimed claim 1, characterized in that the speed of the clock generator is ascertained via a Precision Time Protocol Neighbor Rate Ratio (PTP NRR) method.

5. The method as claimed in claim 1, characterized in that the type of the transmission medium and the
   ascertainment of the synchronization interval
   ascertainment of a drift of a timer of the first control unit
   ascertainment of a timestamp of the first control unit
   ascertainment of the speed of the associated clock generator
   ascertainment of the time difference of the synchronization interval
   ascertainment of the last synchronization
   are communicated to a program in the Ethernet onboard network and a connecting path selection of the program is adapted on the basis of the type of the transmission medium.

6. The method as claimed in claim 1, characterized in that the type of the transmission medium is determined as optical, copper or wireless.

7. The method as claimed in claim 1, characterized in that a transmission security value, which describes a probability of loss of data transmitted by way of the first connecting path, is assigned to the first connecting path on the basis of the type of the transmission medium.

8. The method as claimed in claim 1, characterized in that delay times of a plurality of signals on the first connecting path are determined and the fastest delay time of the plurality of signals is selected, the maximum speed of the first connecting path being determined on the basis of the fastest delay time.

9. The method as claimed in claim 1, characterized in that a delay time of a second signal on a second connecting path, which is different from the first connecting path, between the first control unit and the second control unit is determined, and a maximum speed of the second connecting path is determined, a type of the transmission medium of the second connecting path being determined on the basis of the maximum speed of the second connecting path.

10. The method as claimed in claim 1, characterized in that the method is performed after the first control unit changes from a normal operating mode to an energy-saving mode, or after the first control unit changes from the energy-saving mode to the normal operating mode, or after the first control unit changes both from the normal operating mode to the energy-saving mode and from the energy-saving mode to the normal operating mode.

11. The method as claimed in claim 1, characterized in that the delay time of the first signal is determined using the first control unit and a delay time of a third signal on a third connecting path, which is connected to the first control unit only indirectly, between the second control unit and a third control unit of the Ethernet onboard network is determined using the third control unit, the determination of the delay time of the third signal being triggered by a service message sent from the first control unit to the third control unit.

12. A control unit for an Ethernet onboard network, which, as a first control unit, is designed:
   to send a signal to a second control unit of the Ethernet onboard network and to receive the signal from the second control unit;
   to determine a delay time of the signal on a connecting path to the second control unit;
   to determine a maximum speed of the connecting path on the basis of the delay time; and
   to determine a type of a transmission medium of the connecting path on the basis of the maximum speed,
   and at least includes
   a microprocessor,
   a volatile memory and nonvolatile memory,
   at least two communication interfaces,
   a synchronizable timer,
   the nonvolatile memory containing program instructions that, when executed by the microprocessor,
   characterized in that cause checking of the validity of time synchronization of sensor data of an Ethernet onboard network in a motor vehicle, by performing operations comprising:
   determining a delay time of a first signal on a first connecting path between a first control unit of the Ethernet onboard network and a second control unit of the Ethernet onboard network;
   determining a maximum speed of the first connecting path on the basis of the delay time; and
   determining a type of a transmission medium of the first connecting path on the basis of the maximum speed,
   characterized in that the following steps are carried out:
   identifying at least the first control unit of the Ethernet onboard network;
   synchronizing at least the first control unit of the Ethernet onboard network;
   ascertaining a synchronization interval;
   ascertaining a drift of a timer of the first control unit;
   ascertaining a timestamp of the first control unit;
   reading a timestamp or querying the time of the first control unit;
   comparing the timestamp with a reference clock of the Ethernet onboard network;
   carrying out a delay time measurement;
   ascertaining the speed of an associated clock generator;
   ascertaining a time difference of the synchronization interval;
   ascertaining a last synchronization.

13. The control unit for an Ethernet onboard network as claimed in claim 12, characterized in that the drift of the timer is ascertained via the Institute of Electrical and Electronics Engineers Standard for Local and Metropolitan Area Networks-Timing and Synchronization for Time-Sensitive Applications (IEEE 802.1AS) protocol.

14. The control unit for an Ethernet onboard network as claimed in claim 12, characterized in that the comparison of the timestamp with a reference clock of the Ethernet onboard network results in a difference being calculated in the form Tdeviation=Treference−Tsuspect, wherein Tdeviation is the comparison of the timestamp with a reference clock of the Ethernet onboard network, Treference is a sensor-fusion time, and Tsuspect is a read or queried time.

15. The control unit for an Ethernet onboard network as claimed claim 12, characterized in that the speed of the clock generator is ascertained via the Precision Time Protocol Neighbor Rate Ratio (PTP NRR) method.

16. The control unit for an Ethernet onboard network as claimed in claim 12, characterized in that
   the type of the transmission medium and the
   ascertainment of the synchronization interval
   ascertainment of a drift of a timer of the first control unit
   ascertainment of a timestamp of the first control unit ascertainment of the speed of the associated clock generator ascertainment of the time difference of the synchronization interval ascertainment of the last synchronization are communicated to a program in the Ethernet onboard network and a connecting path selection of the program is adapted on the basis of the type of the transmission medium.

17. The control unit for an Ethernet onboard network as claimed in claim 12, characterized in that the type of the transmission medium is determined as optical, copper or wireless.

18. The control unit for an Ethernet onboard network as claimed in claim 12, characterized in that a transmission security value, which describes a probability of loss of data transmitted by way of the first connecting path, is assigned to the first connecting path on the basis of the type of the transmission medium.

19. The control unit for an Ethernet onboard network as claimed in claim 12, characterized in that delay times of a plurality of signals on the first connecting path are determined and the fastest delay time of the plurality of signals is selected, the maximum speed of the first connecting path being determined on the basis of the fastest delay time.

20. The control unit for an Ethernet onboard network as claimed in claim 12, characterized in that a delay time of a second signal on a second connecting path, which is different from the first connecting path, between the first control unit and the second control unit is determined, and a maximum speed of the second connecting path is determined, a type of the transmission medium of the second connecting path being determined on the basis of the maximum speed of the second connecting path.

21. The control unit for an Ethernet onboard network as claimed in claim 12, characterized in that the method is performed after the first control unit changes from a normal operating mode to an energy-saving mode, or after the first control unit changes from the energy-saving mode to the normal operating mode, or after the first control unit changes both from the normal operating mode to the energy-saving mode and from the energy-saving mode to the normal operating mode.

22. The control unit for an Ethernet onboard network as claimed in claim 12, characterized in that the delay time of the first signal is determined using the first control unit and a delay time of a third signal on a third connecting path, which is connected to the first control unit only indirectly, between the second control unit and a third control unit of the Ethernet onboard network is determined using the third control unit, the determination of the delay time of the third signal being triggered by a service message sent from the first control unit to the third control unit.

23. An Ethernet onboard network for a motor vehicle, having a first control unit and a second control unit, wherein the control units are connected to one another by way of at least one connecting path, wherein the Ethernet onboard network is configured to perform operations comprising:

determining a delay time of a first signal on a first connecting path between the first control unit of the Ethernet onboard network and the second control unit of the Ethernet onboard network;

determining a maximum speed of the first connecting path on the basis of the delay time; and determining a type of a transmission medium of the first connecting path on the basis of the maximum speed, characterized in that the following steps are carried out:

identifying at least the first control unit of the Ethernet onboard network;

synchronizing at least the first control unit of the Ethernet onboard network;

ascertaining a synchronization interval;

ascertaining a drift of a timer of the first control unit;

ascertaining a timestamp of the first control unit;

reading a timestamp or querying the time of the first control unit;

comparing the timestamp with a reference clock of the Ethernet onboard network;

carrying out a delay time measurement;

ascertaining the speed of an associated clock generator;

ascertaining a time difference of the synchronization interval;

ascertaining a last synchronization; and wherein the first control unit is in a form such that the delay time of the first signal is determined using the first control unit and a delay time of a third signal on a third connecting path, which is connected to the first control unit only indirectly, between the second control unit and a third control unit of the Ethernet onboard network is determined using the third control unit, the determination of the delay time of the third signal being triggered by a service message sent from the first control unit to the third control unit.

24. A non-transitory computer-readable medium having stored thereon computer-executable instructions that, when executed by a computer, cause said computer to perform operations comprising:

determining a delay time of a first signal on a first connecting path between a first control unit of the Ethernet onboard network and a second control unit of the Ethernet onboard network;

determining a maximum speed of the first connecting path on the basis of the delay time; and determining a type of a transmission medium of the first connecting path on the basis of the maximum speed, characterized in that the following steps are carried out:

identifying at least the first control unit of the Ethernet onboard network;

synchronizing at least the first control unit of the Ethernet onboard network;

ascertaining a synchronization interval;

ascertaining a drift of a timer of the first control unit;

ascertaining a timestamp of the first control unit;

reading a timestamp or querying the time of the first control unit;

comparing the timestamp with a reference clock of the Ethernet onboard network;

carrying out a delay time measurement;

ascertaining the speed of an associated clock generator;

ascertaining a time difference of the synchronization interval;

ascertaining a last synchronization.

25. The non-transitory computer-readable medium as claimed in claim 24, characterized in that the drift of the timer is ascertained via the Institute of Electrical and Electronics Engineers Standard for Local and Metropolitan Area Networks-Timing and Synchronization for Time-Sensitive Applications (IEEE 802.1AS) protocol.

26. The non-transitory computer-readable medium as claimed in claim 24, characterized in that the comparison of the timestamp with a reference clock of the Ethernet onboard network results in a difference being calculated in the form Tdeviation=Treference−Tsuspect, wherein Tdeviation is the comparison of the timestamp with a reference clock of the Ethernet onboard network, Treference is a sensor-fusion time, and Tsuspect is a read or queried time.

27. The non-transitory computer-readable medium as claimed claim 24, characterized in that the speed of the clock generator is ascertained via the Precision Time Protocol Neighbor Rate Ratio (PTP NRR) method.

28. The non-transitory computer-readable medium as claimed in claim 24, characterized in that
the type of the transmission medium and the
ascertainment of the synchronization interval
ascertainment of a drift of a timer of the first control unit
ascertainment of a timestamp of the first control unit
ascertainment of the speed of the associated clock generator
ascertainment of the time difference of the synchronization interval
ascertainment of the last synchronization
are communicated to a program in the Ethernet onboard network and a connecting path selection of the program is adapted on the basis of the type of the transmission medium.

29. The non-transitory computer-readable medium as claimed in claim 24, characterized in that
the type of the transmission medium is determined as optical, copper or wireless.

30. The non-transitory computer-readable medium as claimed in claim 24, characterized in that a transmission security value, which describes a probability of loss of data transmitted by way of the first connecting path, is assigned to the first connecting path on the basis of the type of the transmission medium.

31. The non-transitory computer-readable medium as claimed in claim 24, characterized in that delay times of a plurality of signals on the first connecting path are determined and the fastest delay time of the plurality of signals is selected, the maximum speed of the first connecting path being determined on the basis of the fastest delay time.

32. The non-transitory computer-readable medium as claimed in claim 24, characterized in that a delay time of a second signal on a second connecting path, which is different from the first connecting path, between the first control unit and the second control unit is determined, and a maximum speed of the second connecting path is determined, a type of the transmission medium of the second connecting path being determined on the basis of the maximum speed of the second connecting path.

33. The non-transitory computer-readable medium as claimed in claim 24, characterized in that the method is performed after the first control unit changes from a normal operating mode to an energy-saving mode, or after the first control unit changes from the energy-saving mode to the normal operating mode, or after the first control unit changes both from the normal operating mode to the energy-saving mode and from the energy-saving mode to the normal operating mode.

34. The non-transitory computer-readable medium as claimed in claim 24, characterized in that the delay time of the first signal is determined using the first control unit and a delay time of a third signal on a third connecting path, which is connected to the first control unit only indirectly, between the second control unit and a third control unit of the Ethernet onboard network is determined using the third control unit, the determination of the delay time of the third signal being triggered by a service message sent from the first control unit to the third control unit.

35. A vehicle having multiple control units comprising an Ethernet onboard network, wherein a control unit for the Ethernet onboard network, which, as a first control unit, is designed:
to send a signal to a second control unit of the Ethernet onboard network and to receive the signal from the second control unit;
to determine a delay time of the signal on a connecting path to the second control unit;
to determine a maximum speed of the connecting path on the basis of the delay time; and
to determine a type of a transmission medium of the connecting path on the basis of the maximum speed, and at least includes
a microprocessor,
a volatile memory and nonvolatile memory,
at least two communication interfaces,
a synchronizable timer,
the nonvolatile memory containing program instructions that, when executed by the microprocessor,
characterized in that cause checking of the validity of time synchronization of sensor data of an Ethernet onboard network in a motor vehicle, by performing operations comprising:
determining a delay time of a first signal on a first connecting path between the first control unit of the Ethernet onboard network and a second control unit of the Ethernet onboard network;
determining a maximum speed of the first connecting path on the basis of the delay time; and
determining a type of a transmission medium of the first connecting path on the basis of the maximum speed,
characterized in that the following steps are carried out:
identifying at least a first control unit of the Ethernet onboard network;
synchronizing at least the first control unit of the Ethernet onboard network;
ascertaining a synchronization interval;
ascertaining a drift of a timer of the first control unit;
ascertaining a timestamp of the first control unit;
reading a timestamp or querying the time of the first control unit;
comparing the timestamp with a reference clock of the Ethernet onboard network;
carrying out a delay time measurement;
ascertaining the speed of an associated clock generator;
ascertaining a time difference of the synchronization interval;
ascertaining a last synchronization.

36. The vehicle having multiple control units as claimed in claim 35, characterized in that the drift of the timer is ascertained via the Institute of Electrical and Electronics Engineers Standard for Local and Metropolitan Area Networks-Timing and Synchronization for Time-Sensitive Applications (IEEE 802.1AS) protocol.

37. The vehicle having multiple control units as claimed in claim 35, characterized in that the comparison of the timestamp with a reference clock of the Ethernet onboard network results in a difference being calculated in the form Tdeviation=Treference−Tsuspect, wherein Tdeviation is the comparison of the timestamp with a reference clock of the Ethernet onboard network, Treference is a sensor-fusion time, and Tsuspect is a read or queried time.

38. The vehicle having multiple control units as claimed claim 35, characterized in that the speed of the clock generator is ascertained via the Precision Time Protocol Neighbor Rate Ratio (PTP NRR) method.

39. The vehicle having multiple control units as claimed in claim 35, characterized in that the type of the transmission medium and the ascertainment of the synchronization interval ascertainment of a drift of a timer of the first control unit ascertainment of a timestamp of the first control unit ascertainment of the speed of the associated clock generator ascertainment of the time difference of the synchronization interval ascertainment of the last synchronization are communicated to a program in the Ethernet onboard network and a connecting path selection of the program is adapted on the basis of the type of the transmission medium.

40. The vehicle having multiple control units as claimed in claim 35, characterized in that the type of the transmission medium is determined as optical, copper or wireless.

41. The vehicle having multiple control units as claimed in claim 35, characterized in that a transmission security value, which describes a probability of loss of data transmitted by way of the first connecting path, is assigned to the first connecting path on the basis of the type of the transmission medium.

42. The vehicle having multiple control units as claimed in claim 35, characterized in that delay times of a plurality of signals on the first connecting path are determined and the fastest delay time of the plurality of signals is selected, the maximum speed of the first connecting path being determined on the basis of the fastest delay time.

43. The vehicle having multiple control units as claimed in claim 35, characterized in that a delay time of a second signal on a second connecting path, which is different from the first connecting path, between the first control unit and the second control unit is determined, and a maximum speed of the second connecting path is determined, a type of the transmission medium of the second connecting path being determined on the basis of the maximum speed of the second connecting path.

44. The vehicle having multiple control units as claimed in claim 35, characterized in that the method is performed after the first control unit changes from a normal operating mode to an energy-saving mode, or after the first control unit changes from the energy-saving mode to the normal operating mode, or after the first control unit changes both from the normal operating mode to the energy-saving mode and from the energy-saving mode to the normal operating mode.

45. The vehicle having multiple control units as claimed in claim 35, characterized in that the delay time of the first signal is determined using the first control unit and a delay time of a third signal on a third connecting path, which is connected to the first control unit only indirectly, between the second control unit and a third control unit of the Ethernet onboard network is determined using the third control unit, the determination of the delay time of the third signal being triggered by a service message sent from the first control unit to the third control unit.

* * * * *